US008804513B2

(12) United States Patent
Shen et al.

(10) Patent No.: US 8,804,513 B2
(45) Date of Patent: Aug. 12, 2014

(54) METHODS AND SYSTEMS FOR CONTROLLING SIP OVERLOAD

(75) Inventors: Qi Shen, New York, NY (US); Henning Schulzrinne, Leonia, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 525 days.

(21) Appl. No.: 13/035,309

(22) Filed: Feb. 25, 2011

(65) Prior Publication Data
US 2012/0008495 A1    Jan. 12, 2012

Related U.S. Application Data

(60) Provisional application No. 61/308,037, filed on Feb. 5, 2010.

(51) Int. Cl.
*H04L 12/28*    (2006.01)
(52) U.S. Cl.
USPC .......................................... 370/231
(58) Field of Classification Search
USPC ........................... 370/230, 338, 352
See application file for complete search history.

(56) References Cited

U.S. PATENT DOCUMENTS

| | | | |
|---|---|---|---|
| 6,614,805 B1 * | 9/2003 | Raahemi et al. ............ | 370/468 |
| 6,970,909 B2 | 11/2005 | Schulzrinne | |
| 7,257,201 B2 | 8/2007 | Singh et al. | |
| 7,266,091 B2 | 9/2007 | Singh et al. | |
| 7,296,091 B1 | 11/2007 | Dutta et al. | |
| 7,610,384 B1 | 10/2009 | Schulzrinne et al. | |
| 2007/0233896 A1 * | 10/2007 | Hilt et al. .................... | 709/238 |
| 2007/0274474 A1 | 11/2007 | Singh et al. | |
| 2009/0290695 A1 | 11/2009 | Schulzrinne et al. | |
| 2010/0002690 A1 | 1/2010 | Schulzrinne et al. | |

OTHER PUBLICATIONS

U.S. Appl. No. 11/776,319, Oct. 12, 2012 Amendment and Request for Continued Examination (RCE).
U.S. Appl. No. 09/596,864, Sep. 28, 2007 Amendment and Issue Fee payment.
U.S. Appl. No. 09/596,864, Aug. 13, 2007 Notice of Allowance.
U.S. Appl. No. 09/596,864, May 16, 2007 Response to Non-Final Office Action.
U.S. Appl. No. 09/596,864, Apr. 9, 2007 Non-Final Office Action.
U.S. Appl. No. 09/596,864, Dec. 11, 2006 Response to Ex Parte Quayle Action.
U.S. Appl. No. 09/596,864, Oct. 13, 2006 Ex Parte Quayle Action.
U.S. Appl. No. 09/596,864, Sep. 29, 2006 Response to Final Office Action.
U.S. Appl. No. 09/596,864, Jul. 27, 2006 Final Office Action.
U.S. Appl. No. 09/596,864, May 2, 2006 Response to Non-Final Office Action.
U.S. Appl. No. 10/480,505, filed Nov. 24, 2004, (Abandoned).
U.S. Appl. No. 09/596,864, Dec. 28, 2005 Non-Final Office Action.

(Continued)

*Primary Examiner* — Wanda Z Russell
(74) *Attorney, Agent, or Firm* — Baker Botts, L.L.P.

(57) ABSTRACT

Techniques for controlling Session Initiation Protocol (SIP) overload between a sending entity and a receiving entity includes receiving a message at a send buffer at the sending entity and forwarding the message to a receive buffer at the receiving entity if the send buffer is empty of other messages or rejecting the message if the send buffer is not empty of other messages.

17 Claims, 38 Drawing Sheets

(56) References Cited

OTHER PUBLICATIONS

U.S. Appl. No. 09/596,864, Oct. 6, 2005 Request for Continued Examination (RCE).
U.S. Appl. No. 09/596,864, Sep. 15, 2005 Advisory Action.
U.S. Appl. No. 09/596,864, Aug. 29, 2005 Response to Final Office Action.
U.S. Appl. No. 09/596,864, May 18, 2005 Final Office Action.
U.S. Appl. No. 09/596,864, Jan. 6, 2005 Response to Non-Final Office Action.
U.S. Appl. No. 09/596,864, Sep. 3, 2004 Non-Final Office Action.
U.S. Appl. No. 09/980,885, Sep. 16, 2009 Issue Fee payment.
U.S. Appl. No. 09/980,885, Jun. 16, 2009 Notice of Allowance.
U.S. Appl. No. 09/980,885, May 20, 2009 Amendment and Request for Continued Examination (RCE).
U.S. Appl. No. 09/980,885, Nov. 20, 2008 Final Office Action.
U.S. Appl. No. 09/980,885, Jul. 11, 2008 Response to Non-Final Office Action.
U.S. Appl. No. 09/980,885, Jan. 11, 2008 Non-Final Office Action.
U.S. Appl. No. 09/980,885, Dec. 17, 2007 Amendment and Request for Continued Examination (RCE).
U.S. Appl. No. 09/980,885, Nov. 15, 2007 Pre-Brief Appeal Conference Decision.
U.S. Appl. No. 09/980,885, Jul. 23, 2007 Pre-Brief Conference Request and Notice of Appeal.
U.S. Appl. No. 09/980,885, Jan. 23, 2007 Final Office Action.
U.S. Appl. No. 09/980,885, Oct. 13, 2006 Response to Non-Compliant.
U.S. Appl. No. 09/980,885, Sep. 25, 2006 Notice of Non-Compliant.
U.S. Appl. No. 09/980,885, Sep. 18, 2006 Response to Non-Compliant.
U.S. Appl. No. 09/980,885, Sep. 6, 2006 Notice of Non-Compliant.
U.S. Appl. No. 09/980,885, Aug. 23, 2006 Response to Non-Final Office Action.
U.S. Appl. No. 09/980,885, Apr. 21, 2006 Non-Final Office Action.
U.S. Appl. No. 10/085,837, Aug. 1, 2007 Issue Fee payment.
U.S. Appl. No. 10/085,837, May 31, 2007 Notice of Allowance.
U.S. Appl. No. 10/085,837, May 17, 2007 Response to Final Office Action.
U.S. Appl. No. 10/085,837, Mar. 28, 2007 Final Office Action.
U.S. Appl. No. 10/085,837, Jan. 11, 2007 Response to Non-Final Office Action.
U.S. Appl. No. 10/085,837, Sep. 20, 2006 Non-Final Office Action.
U.S. Appl. No. 10/085,837, Jun. 26, 2006 Response to Non-Final Office Action.
U.S. Appl. No. 10/085,837, Mar. 20, 2006 Non-Final Office Action.
U.S. Appl. No. 10/333,352, Jul. 11, 2007 Issue Fee payment.
U.S. Appl. No. 10/333,352, Apr. 12, 2007 Notice of Allowance.
U.S. Appl. No. 10/333,352, Feb. 2, 2007 Response to Non-Final Office Action.
U.S. Appl. No. 10/333,352, Aug. 30, 2006 Non-Final Office Action.
U.S. Appl. No. 10/380,138, Sep. 8, 2005 Issue Fee payment.
U.S. Appl. No. 10/380,138, Jun. 21, 2005 Notice of Allowance.
U.S. Appl. No. 10/380,138, Dec. 27, 2004 Response to Non-Final Office Action.
U.S. Appl. No. 10/380,138, Jun. 22, 2004 Non-Final Office Action.
U.S. Appl. No. 10/480,505, Dec. 1, 2009 Notice of Abandonment.
U.S. Appl. No. 10/480,505, Oct. 14, 2009 Pre-Brief Appeal Conference Decision.
U.S. Appl. No. 10/480,505, May 26, 2009 Pre-Brief Appeal Conference Request and Notice of Appeal.
U.S. Appl. No. 10/480,505, May 1, 2009 Advisory Action.
U.S. Appl. No. 10/480,505, Apr. 22, 2009 Response to Final Office Action.
U.S. Appl. No. 10/480,505, Feb. 12, 2009 Examiner Interview Summary.
U.S. Appl. No. 10/480,505, Feb. 3, 2009 Letter Requesting Interview with Examiner.
U.S. Appl. No. 10/480,505, Nov. 26, 2008 Final Office Action.
U.S. Appl. No. 10/480,505, Aug. 28, 2008 Response to Non-Final Office Action.
U.S. Appl. No. 10/480,505, May 30, 2008 Non-Final Office Action.
U.S. Appl. No. 10/480,505, Feb. 19, 2008 Advisory Action.
U.S. Appl. No. 10/480,505, Feb. 12, 2008 Amendment and Request for Continued Examination (RCE).
U.S. Appl. No. 10/480,505, Jan. 29, 2008 Response to Final Office Action.
U.S. Appl. No. 10/480,505, Oct. 31, 2007 Final Office Action.
U.S. Appl. No. 10/480,505, Aug. 15, 2007 Response to Non-Final Office Action.
Almeroth et al., Using Satellite Links as Delivery Paths in the Multicast Backbone (Mbone) WOSBIS 98, pp. 47-54, Dallas, Texas, Oct. 30, 1998.
Ryu, Bo et al, Managing IP Services over a PACS Packet Network, IEEE Network, Jul./Aug. 1998, pp. 4-10.
Handley M et al. "RFC 2543 SIP: Session Initiation Protocol" 19990301. 19990300, Mar. 1, 1999, XP015008326.
Peter Wilson, "Packet Network Proof," Telephony Online, Mar. 22, 1999.
Kelly Carroll, "Internet Boosts Unified Messaging: Wireless Carriers Turn to Web-Based Systems," Telephony Online, Apr. 24, 2000.
"'Killer App' Is on the Loose: Unified Messaging Is a Key Service Enabled by the Next-Generation Network," Communication News, Jan. 2000.
U.S. Appl. No. 10/480,505, May 15, 2007 Non-Final Office Action.
U.S. Appl. No. 11/776,319, Jan. 19, 2012 Terminal Disclaimer Review Decision.
U.S. Appl. No. 11/776,319, Aug. 16, 2011 Terminal Disclaimer and Response to Non-Final Office Action.
U.S. Appl. No. 11/776,319, May 18, 2011 Non-Final Office Action.
U.S. Appl. No. 11/776,319, Mar. 4, 2011 Response to Non-Final Office Action.
U.S. Appl. No. 11/776,319, Nov. 4, 2010 Non-Final Office Action.
U.S. Appl. No. 12/468,707, Dec. 19, 2011 Non-Final Office Action.
Leonard Chong et al., "Towards a Unified Messaging Environment Over the Internet," Cybernetics and Systems, Sep. 1999.
Brian Quinton, "Microsoft, Sprint Offer Unified Messaging Product," Telephony Online, Jun. 14, 1999.
Richard Tarabour et al., "Manageable Messages," Telephony Online, Jun. 7, 1999.
R. Babbage et al., "Internet Phone—Changing the Telephony Paradigm," Internet and Beyond 231 (eds. S. Sim & J. Davies, 1998).
Susan Biagi, "IP Networks Now and Forever: Carriers Must Bridge Packet, Circuit-Switched Networks," Telephony Online, Oct. 12, 1998.
Rosenberg, et al., "SIP Extensions for Instant Messaging." Internet Draft, Internet Engineering Task Force, Jun. 2000.
Mahy, et al., "SIP Extensions for Messaging Waiting Indication." Internet Draft, Internet Engineering Task Force, Jul. 2000.
U.S. Appl. No. 12/560,821, Jun. 8, 2012 Non-Final Office Action.
U.S. Appl. No. 13/588,369, filed Aug. 17, 2012.
U.S. Appl. No. 12/468,707, Aug. 17, 2012 Issue Fee payment.
U.S. Appl. No. 11/776,319, Sep. 11, 2012 Advisory Action.
U.S. Appl. No. 11/776,319, Aug. 30, 2012 Applicant Iniated Interview Summary.
U.S. Appl. No. 11/776,319, Aug. 13, 2012 Response to Final Office Action.
U.S. Appl. No. 11/776,319, Jun. 4, 2013 Non-Final Office Action.
U.S. Appl. No. 11/776,319, Apr. 12, 2012 Final Office Action.
U.S. Appl. No. 12/468,707, May 21, 2012 Notice of Allowance.
U.S. Appl. No. 12/468,707, Mar. 19, 2012 Response to Non-Final Office Action.

* cited by examiner

Types of SIP server overload

Proxy to proxy overload

Types of SIP server overload

UA to registrar overload

200 OK

ACK

Screen logs in default SIP-over-TCP test

| | | | Messages | Retrans | Timeout | Unexpected-Msg |
|---|---|---|---|---|---|---|
| INVITE --------> | | B-RTD1 | 25899 | 0 | | |
| 100 <-------- | | | 25899 | 0 | 0 | 0 |
| 477 <-------- | | | 0 | 0 | 0 | 0 |
| 180 <-------- | | | 25899 | 0 | 0 | 0 |
| 200 <-------- | | E-RTD1 | 25899 | 216652 | 0 | 0 |
| ACK --------> | | | 10106 | 0 | | |
| BYE --------> | | B-RTD2 | 10106 | 0 | | |
| 202 <-------- | | E-RTD2 | 3821 | 0 | 6285 | 3567 |

UAC

Screen logs in default SIP-over-TCP test

| | | | Messages | Retrans | Timeout | Unexpected-Msg |
|---|---|---|---|---|---|---|
| --------> | INVITE | B-RTD1 | 25899 | 0 | 6285 | 13576 |
| <-------- | 180 | | 25899 | 0 | | |
| <-------- | 200 | | 25899 | 223167 | 22078 | |
| --------> | ACK | E-RTD1 | 3821 | 0 | 0 | 0 |
| --------> | BYE | | 3821 | 0 | 0 | 0 |
| <-------- | 202 | | 3821 | 0 | | |

UAS

FIG. 11

Screen logs with ECS+MB+SF

|  |  |  | Messages | Retrans | Timeout | Unexpected-Msg |
|---|---|---|---|---|---|---|
| INVITE | --------> | B-RTD1 | 35999 | 0 |  |  |
| 100 | <-------- |  | 35999 | 0 | 0 | 0 |
| 477 | <-------- |  | 22019 | 0 | 0 | 0 |
| 180 | <-------- |  | 13980 | 0 | 0 | 0 |
| 200 | <-------- | E-RTD1 | 13980 | 0 | 0 | 0 |
| ACK | --------> |  | 13980 | 0 |  |  |
| BYE | --------> | B-RTD2 | 13980 | 0 |  |  |
| 202 | <-------- | E-RTD2 | 13980 | 0 | 0 | 0 |

UAC

FIG. 18A

Screen logs with ECS+MB+SF

|  |  |  | Messages | Retrans | Timeout | Unexpected-Msg |
|---|---|---|---|---|---|---|
| --------> | INVITE | B-RTD1 | 13980 | 0 | 0 | 0 |
| <-------- | 180 |  | 13980 | 0 |  |  |
| <-------- | 200 |  | 13980 | 0 | 0 |  |
| --------> | ACK | E-RTD1 | 13980 | 0 | 0 | 0 |
| --------> | BYE |  | 13980 | 0 | 0 | 0 |
| <-------- | 202 |  | 13980 | 0 |  |  |

UAS

FIG. 18B

Screen logs with ICS+MB+SF

|  |  |  | Messages | Retrans | Timeout | Unexpected-Msg |
|---|---|---|---|---|---|---|
| INVITE | --------> | B-RTD1 | 35999 | 0 |  |  |
| 100 | <-------- |  | 35999 | 0 | 0 | 0 |
| 477 | <-------- |  | 22742 | 0 | 0 | 0 |
| 180 | <-------- |  | 13257 | 0 | 0 | 0 |
| 200 | <-------- | E-RTD1 | 13257 | 0 | 0 | 0 |
| ACK | --------> |  | 13257 | 0 |  |  |
| BYE | --------> | B-RTD2 | 13257 | 0 |  |  |
| 202 | <-------- | E-RTD2 | 13257 | 0 | 0 | 0 |

UAC

Screen logs with ICS+MB+SF

|  |  |  | Messages | Retrans | Timeout | Unexpected-Msg |
|---|---|---|---|---|---|---|
| --------> | INVITE | B-RTD1 | 13257 | 0 | 0 | 0 |
| <-------- | 180 |  | 13257 | 0 |  |  |
| <-------- | 200 |  | 13257 | 0 | 0 |  |
| --------> | ACK | E-RTD1 | 13257 | 0 | 0 | 0 |
| --------> | BYE |  | 13257 | 0 | 0 | 0 |
| <-------- | 202 |  | 13257 | 0 |  |  |

UAS

FIG. 23

METHODS AND SYSTEMS FOR CONTROLLING SIP OVERLOAD

CROSS REFERENCE TO RELATED APPLICATIONS

This application claims the benefit of priority to U.S. Provisional Application Ser. No. 61/308,037, filed Feb. 25, 2010, for "Systems, Methods, and Media for Controlling SIP Overload," the entirety of the disclosure of which is explicitly incorporated by reference herein.

BACKGROUND

1. Field

The present application relates to systems, methods, and media for controlling Session Initiation Protocol ("SIP") overload.

2. Background Art

SIP is an application layer signaling protocol for creating, modifying, and terminating media sessions in the Internet. SIP has been adopted by major standardization bodies including 3GPP, ITU-T, and ETSI as the core signaling protocol of Next Generation Networks (NGN) for services such as VoIP, conferencing, Video on Demand (VoD), presence, and Instant Messaging (IM). The increasingly wide deployment of SIP has raised the requirements for SIP server overload management solutions. A SIP server can be overloaded for many reasons such as emergency induced call volume, flash crowds generated by TV programs (e.g., American Idol), special events such as "free tickets to third caller", or denial of service attacks.

There exists a need to addresses a SIP-over-TCP overload control problem. There is also a need to utilize the existing TCP infrastructure to solve the overload problem without changing the SIP protocol specification as is needed for the UDP-based application level feedback mechanisms.

SUMMARY

Methods and systems for controlling SIP overload are disclosed herein.

In some embodiments, methods for controlling Session Initiation Protocol (SIP) overload between a sending entity and a receiving entity include receiving a message at a send buffer at the sending entity and forwarding the message to a receive buffer at the receiving entity if the send buffer is empty of other messages or rejecting the message if the send buffer is not empty of other messages.

The message can be an INVITE message and can be formatted in accordance with TCP. The sending and or receiving entity can be a proxy server. Rejecting the message can include sending a rejection message. The method can further comprise setting the receive buffer size to a size that holds about two or less INVITE messages. For example, the receive buffer size can be set to about 2 KB. Additionally or alternatively, the method can further include setting an application buffer size of the receiving entity to a size that holds about two or less INVITE messages. For example, the application buffer size of the receiving entity can be set to a size of about 2 KB.

The method can further include receiving the message at the receive buffer of the receiving entity from the send buffer of the sending entity. The message can be sent from the receive buffer to an application buffer of the receiving entity. The message can be received at the application buffer at the receiving entity.

In one embodiment, the message comprises an INVITE or a non-INVITE message and if the message is an INVITE, the forwarding comprises forwarding the INVITE to the receive buffer at the receiving entity if the send buffer is empty of other messages or rejecting the INVITE if the send buffer is not empty of other messages, and if the message is a non-INVITE message, the forwarding comprises forwarding the message to a receive buffer at the receiving entity.

In some embodiments, another method for controlling Session Initiation Protocol (SIP) overload between a sending entity and a receiving entity includes receiving a message at a send buffer at the sending entity, and forwarding the message to a receive buffer at the receiving entity if the send buffer does not indicate an overload condition or rejecting the message if the send buffer indicates an overload condition. The send buffer can indicate an overload condition if the send buffer is not empty of other messages. The method can have any of the additional features described for the method above In some embodiments, systems for controlling Session Initiation Protocol (SIP) overload between a sending entity and a receiving entity include a send buffer for receiving a message at the sending entity, and a processor, coupled to the send buffer. The processor is adapted to, in response to receiving the message, cause the send buffer to forward the message to a receive buffer at the receiving entity if the send buffer is empty of other messages or rejects the message if the send buffer is not empty of other messages. The message can be an INVITE message and can be formatted in accordance with TCP. The sending and or receiving entity can be a proxy server. The receive buffer can have a size that holds about two or less INVITE messages. The system can have any of the additional features described for the methods above.

BRIEF DESCRIPTION OF THE DRAWINGS

Further features, the nature, and various advantages of the disclosed subject matter will be more apparent from the following detailed description of the embodiments and the accompanying drawings in which:

FIG. 11 is a chart of the screen logs in the default SIP-over-TCP testing.

FIGS. 18A and 18B are charts of the screen logs for the system of FIG. 14.

FIG. 23 is a chart of the screen logs for the system of FIG. 19.

FIG. 27(*b*) is a chart illustrating the throughput under varying RE application buffer sizes with minimized SE send buffer size and default RE application buffer size.

Figures are incorporated and constitute part of this disclosure. Moreover, while the disclosed subject matter will now be described in detail with reference to the Figures, it is done so in connection with the illustrative embodiments.

DETAILED DESCRIPTION

SIP defines two basic types of entities: User Agents (UAs) and servers. UAs represent SIP end points. SIP servers consist of registrar servers for location management and proxy servers for message forwarding. SIP messages are divided into requests (e.g., INVITE and BYE to create and terminate a SIP session, respectively) and responses (e.g., 200 OK for confirming a session setup). The set of messages including a request and all its associated responses is called a SIP transaction.

SIP message forwarding, known as proxying, is a critical function of the SIP infrastructure. This forwarding process is provided by proxy servers and can be either stateless or stateful. Stateless proxy servers do not maintain state information about the SIP session and therefore tend to be more scalable. However, many standard application functionalities, such as authentication, authorization, accounting, and call forking, require the proxy server to operate in a stateful mode by keeping different levels of session state information. Therefore, the disclosed subject matter focuses on stateful SIP proxying.

Figure 1:
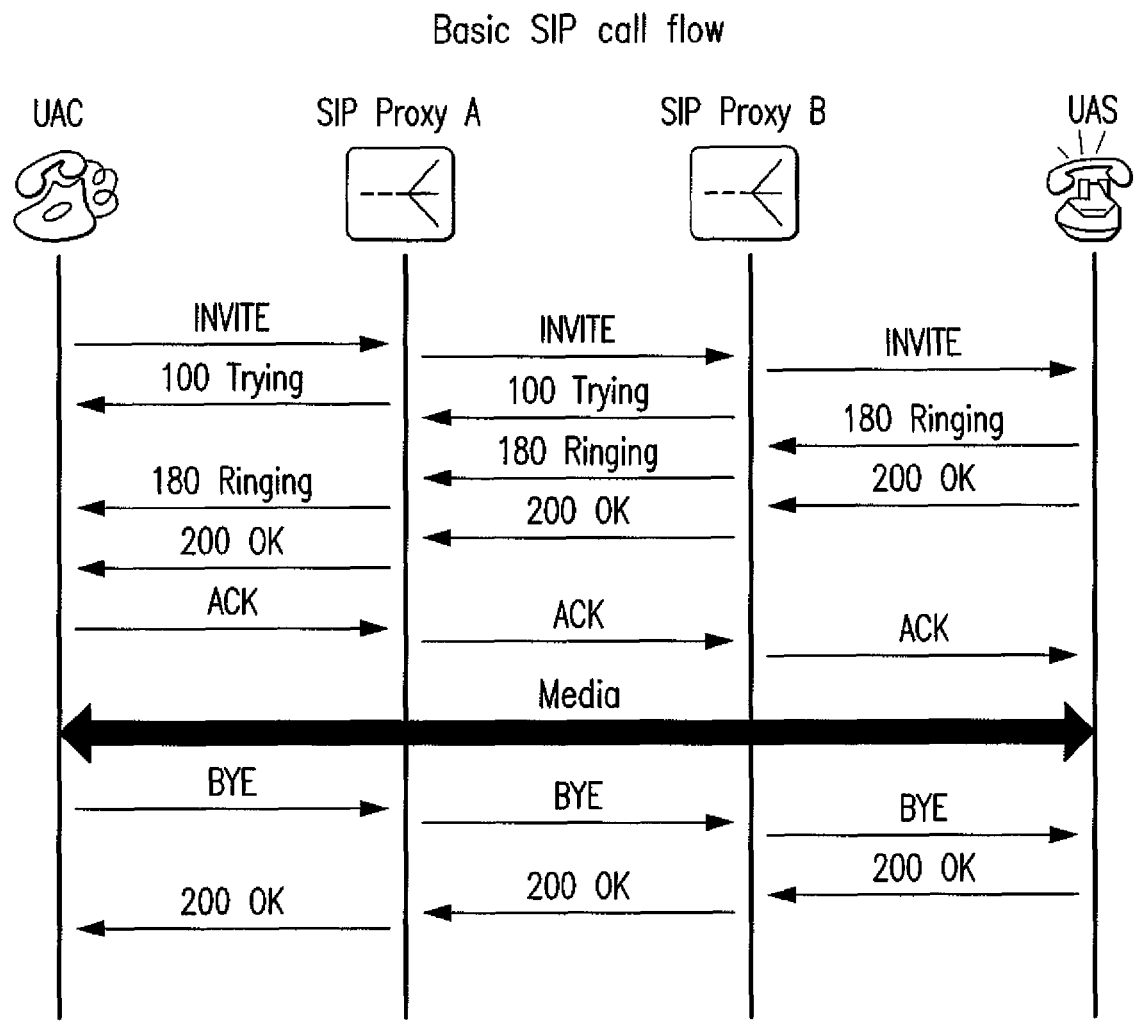
FIG. 1 is a diagram illustrating a typical message flow of SIP proxying.

FIG. 1 shows a typical message flow of stateful SIP proxying. Two SIP UAs, designated as User Agent Client (UAC) and User Agent Server (UAS), represent the caller and callee of a multimedia session. The UAC wishes to establish a session with the UAS and sends an INVITE request to proxy A. Proxy A looks up the contact address for the SIP URI of the UAS and, assuming it is available, forwards the message to proxy B, where the UAS can be reached. Both proxy servers also send 100 Trying response to inform the upstream SIP entities that the message has been received. After proxy B forwards the message to the UAS. The UAS acknowledges receipt of the INVITE with a 180 Ringing response and rings the callee's phone. When the callee actually picks up the phone, the UAS sends out a 200 OK response. Both the 180 Ringing and 200 OK make their way back to the UAC. The UAC then generates an ACK request for the 200 OK. Having established the session, the two endpoints communicate directly, peer-to-peer, using a media protocol such as RTP. The media session does not traverse the proxies, by design. When the conversation is finished, the UAC "hangs up" and generates a BYE request that the proxy servers forward to the UAS. The UAS then responds with a 200 OK response which is forwarded back to the UAC.

Figure 2:
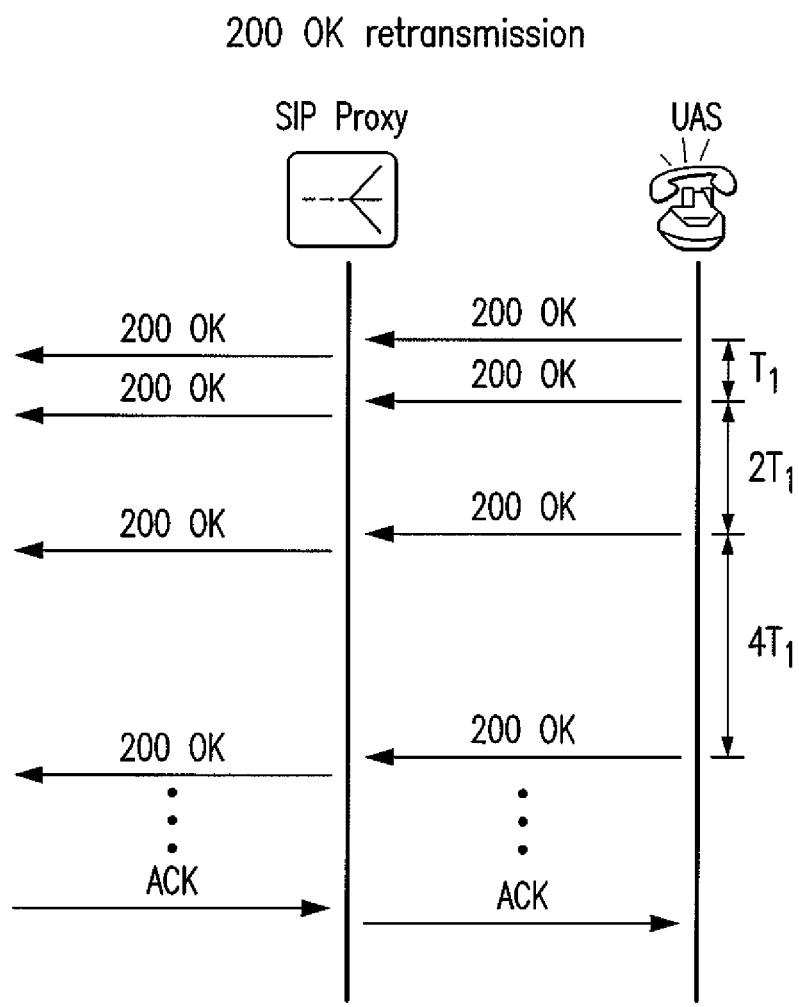
FIG. 2 is a diagram illustrating a 200 OK retransmission timer.

SIP is an application level protocol on top of the transport layer. It can run over any common transport layer protocols, such as UDP, TCP and SCTP. SIP defines quite a number of timers. One group of timers is for hop-to-hop message retransmissions in case a message is lost. These retransmission timers are not used when TCP is the transport because TCP already provides a reliable transfer. There is however a retransmission timer for the end-to-end 200 OK responses which is enabled even when using TCP transport, in order to accommodate circumstances where not all links in the path are using reliable transport. The 200 OK retransmission timer is shown in FIG. 2. The timer starts with $T_1=500$ ms and doubles until it reaches $T_2=4$ s. From then on the timer value remains at $T_2$ until the total timeout period exceeds 32 s, when the session is considered to have failed. Note that even if the whole path is TCP-based, as long as the message round trip time exceeds 500 ms, the 200 OK timer will expire and trigger retransmission. The UAC should generate an ACK upon receiving a 200 OK. The UAS ceases the 200 OK retransmission timer when it receives a corresponding ACK.

Figure 3A:
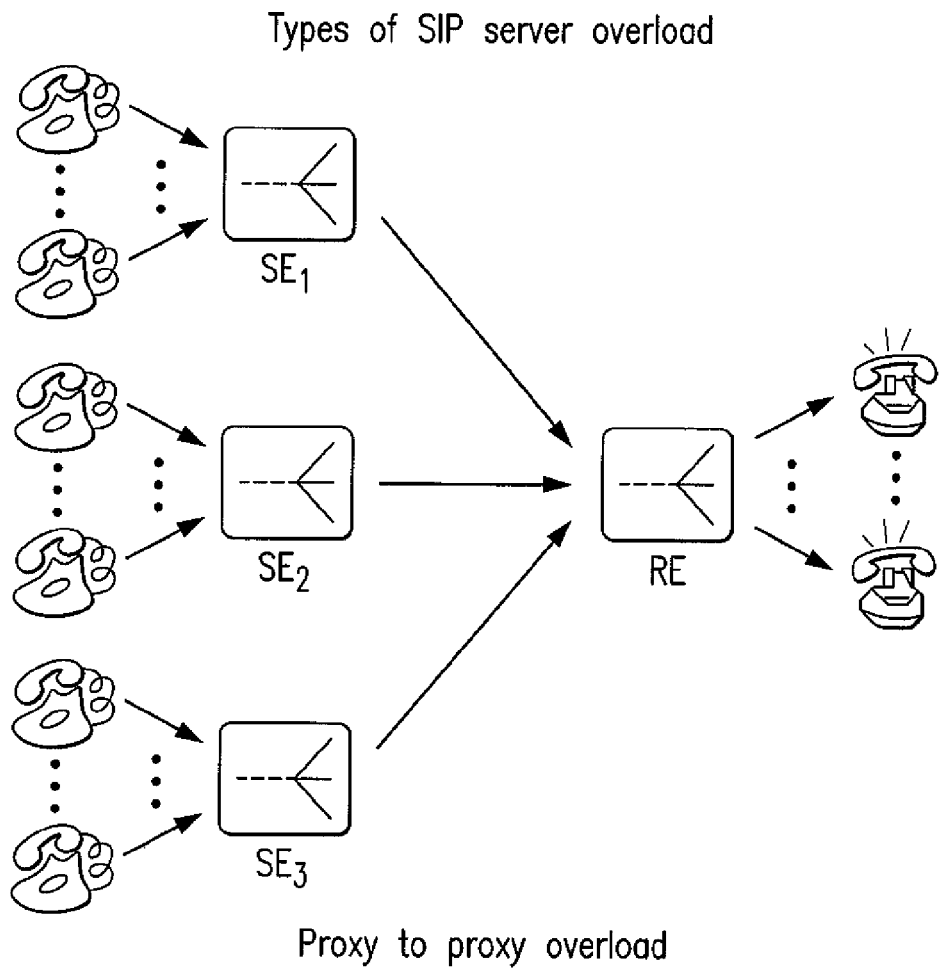
FIGS. 3A and 3B are diagrams illustrating two types of SIP server overload.
Figure 3B:
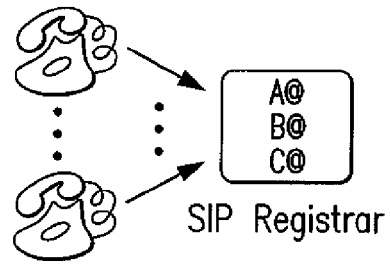

There are many causes to SIP overload, but the resulting SIP overload cases can usually be grouped into either of the two types: proxy-to-proxy overload or UA-to-registrar overload. A typical proxy-to-proxy overload topology is illustrated in FIG. 3(a), where the overloaded RE is connected to a relatively small number of upstream SEs. One example of proxy-to-proxy overload is a special event like "free tickets to the third caller", also referred to as flash crowds. Suppose the RE is the service provider for a hotline N. $SE_1$, $SE_2$ and $SE_3$ are three service providers that reach the hotline through the RE. When the hotline is activated, the RE is expected to receive a large call volume to the hotline from $SE_1$, $SE_2$ and $SE_3$ that far exceeds its usual call volume, potentially putting the RE into overload. The second type of overload, known as UA-to-registrar overload and shown in FIG. 3(b), occurs when a large number of UAs overload the next hop server directly. A typical example is avalanche restart, which happens when power is just restored after a mass power failure in a large metropolitan area and a huge number of SIP devices boot up trying to perform registration simultaneously. The disclosed subject matter focuses on the proxy-to-proxy overload problem.

TCP is a reliable transport protocol with its built-in flow and congestion control mechanisms. Flow control is exercised between two TCP end points. The purpose of TCP flow control is to avoid a sender from sending too much data that overflow the receiver's socket buffer. Flow control is achieved by having the TCP receiver impose a receive window on the sender side indicating how much data the receiver is willing to accept at that moment; on the other hand, congestion control is the process of TCP sender imposing a congestion window by itself to avoid congestion inside the network. The TCP sender assesses network congestion by observing transmission timeout or the receipt of duplicate TCP ACKs, and adjusts the congestion window to slow down or increase the transmission rate as appropriate. Thus, a TCP sender is governed by both the receiver flow control window and sender congestion control window during its operation.

Figure 4:
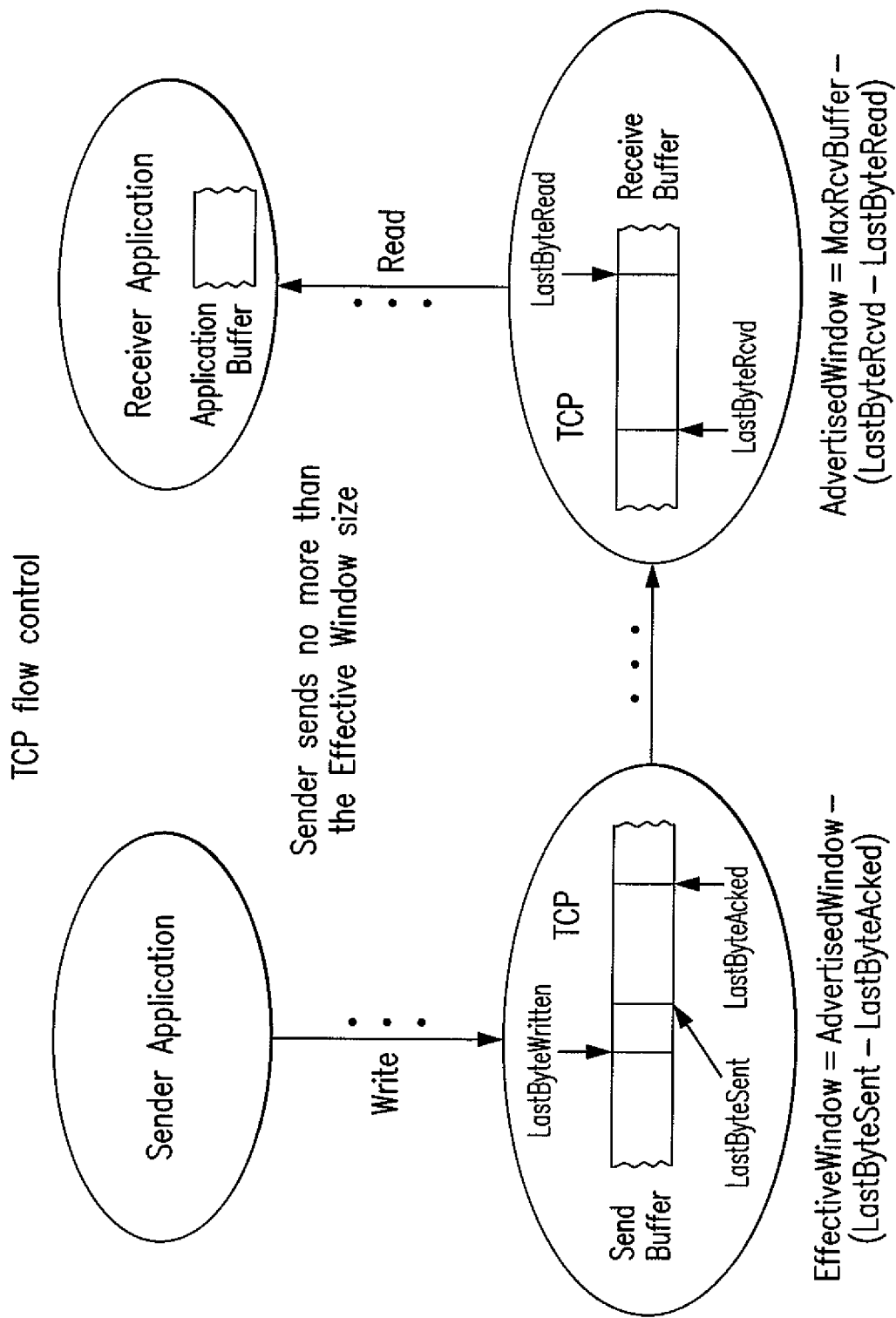
FIG. 4 is a diagram illustrating TCP flow control architecture.

The disclosed subject matter is focused on using TCP flow control in order for the receiving end point to deliver transport layer feedback to the sending end point to facilitate higher layer overload control. TCP flow control architecture is illustrated in FIG. 4. A socket level TCP connection usually maintains a send buffer and a receive buffer at the two connection end points. The receiver application reads data from the receive buffer to its application buffer. The receiver TCP computes its current receive buffer availability as its advertised window to the sender TCP. The sender TCP never sends more data than an effective window size derived based on the receiver advertised window and data that has been sent but not yet acknowledged.

In the Examples described below, the default send buffer size is 16 KB and the default receive buffer size is 85 KB. Since the Linux operating system uses about ¼ of the socket receive buffer size for bookkeeping overhead, the estimated effective default receive buffer size is about 64 KB. The receive buffer sizes will refer to this effective value. The SIP server application used allocates a default 64 KB application buffer.

Linux also provides convenient API to allow applications to manipulate connection-specific socket buffer sizes using the SO_SNDBUF and SO_RCVBUF options of the setsockopt function call. It should be noted that when using setsockopt to supply a socket send or receive buffer size, the Linux system doubles the requested size. E.g., if 8K is supplied as SO_SNDBUF to setsockopt, the system will return a 16 KB send buffer. Furthermore, at the receiver side, if a 1,365 B socket receive buffer is specified, the system doubles its size to allocate a 2,730 B receive buffer. Excluding the ¼ overhead, the effective receive buffer is then about 2 KB.

In addition, Linux supports various API calls that allow the applications to retrieve real-time status information about the underlying TCP connection. For example, using the SIOCOUTQ option of the ioctl call, the application can learn about the amount of unsent data currently in the socket send buffer.

As described in detail in the Examples below, experimental evaluation of the default SIP-over-TCP overload performance using a popular open source SIP server implementation on a typical Intel-based Linux testbed was performed. The results demonstrate the traditional notion of TCP flow control alone is insufficient for preventing SIP overload congestion collapse for real-time session-based loads, which cover a broad range of applications, e.g., from SIP servers to datacenter systems.

A reason why TCP flow control feedback does not prevent SIP congestion collapse has to do with the session-based nature and real-time setup requirement of SIP load. Request and response messages in the same SIP session arrive at different times from upstream and downstream SIP entities; start-of-session requests trigger all the remaining insession messages and are therefore especially expensive. The transport level connection-based TCP flow control, without knowing the causal relationship about the messages, will admit too many start-of-session requests and result in a continued accumulation of in-progress sessions in the system. The messages for all the admitted sessions soon fill up the system buffers and entail a long queuing delay. The long delay not only triggers the SIP end-to-end response retransmission timer, but also significantly slows down the effective rate of server session setup. This forms a back pressure through the TCP flow control window feedback which ultimately propagates upstream to the session originators, hindering the session originators from generating further in-session messages that could complete the setup of accepted sessions. The combined delayed message generation and processing as well as response retransmission lead to SIP-over-TCP congestion collapse.

The disclosed subject matter provides SIP overload control mechanisms within the existing TCP flow control infrastructure. In order to prevent the SIP-over-TCP congestion collapse, the number of INVITEs that can be admitted is limited to avoid too many active sessions accumulating in the system, and for all admitted INVITEs, the rest of the session messages is completed within finite delay. To accommodate the distinction between start-of-session requests and other messages, the concept of connection split is introduced. To meet the delay requirements and prevent retransmission, smart forwarding algorithms combined with buffer minimization are utilized. The parameter-free smart forwarding algorithm is used to release the excessive load at the sending server before they reach the receiving server. The minimization of the essential TCP flow control buffer—the socket receive buffer is used to both enable timely feedback and avoid long queuing delay.

Mechanisms in accordance with the disclosed subject matter contain only a single tuning parameter for which a recommended value is provided. Implementation of mechanisms in accordance with the disclosed subject matter exploit existing Linux socket API calls and are extremely simple. The disclosed subject matter does not require any modifications at the kernel level and does not mandate any change to the SIP or TCP specification. As described in the Examples below, mechanisms in accordance with the disclosed subject matter are evaluated on a common Intel-based Linux testbed using the popular open source OpenSIPS server with up to ten upstream SEs overloading the RE at up to 10 times the server capacity. The performance is found to be improved from zero to full capacity with mechanisms in accordance with the disclosed subject matter. The Examples also demonstrate that under heavy overload, the mechanisms in accordance with the disclosed subject matter maintain a fair share of the capacity for competing upstream SEs.

Figure 5:
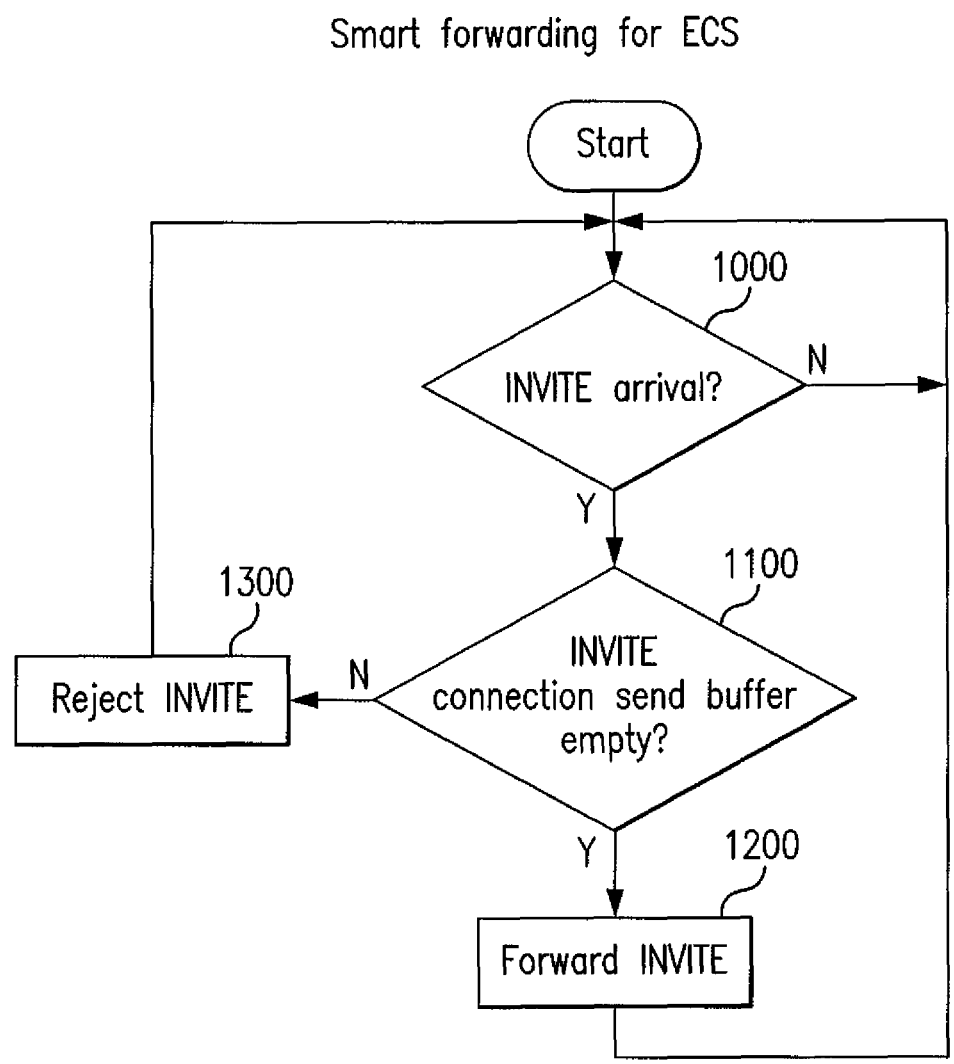
FIG. 5 is a diagram illustrating a method for controlling Session Initiation Protocol (SIP) overload for an INVITE message, according to some embodiments of the disclosed subject matter.

Thus, in accordance some embodiments of the disclosed subject matter, a method for controlling Session Initiation Protocol (SIP) overload between a sending entity and a receiving entity includes receiving a message at a send buffer at the sending entity and forwarding the message to a receive buffer at the receiving entity if the send buffer is empty of other messages or rejecting the message if the send buffer is not empty of other messages. For the purpose of illustration and not limitation, FIG. 5 is a diagram illustrating the method for controlling Session Initiation Protocol (SIP) overload for an INVITE message. At 1000, the system (e.g. a processor coupled to the send buffer) checks whether an INVITE message has arrived. If an INVITE has arrived, the system checks whether the current INVITE connection send buffer is empty at 1100. If yes, then the INVITE is forwarded to the receive buffer of the receiving entity at 1200. If the send buffer is not empty, they system rejects the INVITE at 1300, for example with an explicit SIP rejection message.

The message can be an INVITE message, or any other suitable message requiring SIP overload control. The message can be formatted in accordance with TCP, or any other common transport layer protocols. The sending entity could be an end user, a proxy server, or any other suitable sending entity, such as, for example, a Back-to-Back User Agent (e.g., B2BUA The receiving entity can be a proxy server, or any other suitable receiving entity (e.g., B2BUA).

Figure 6:
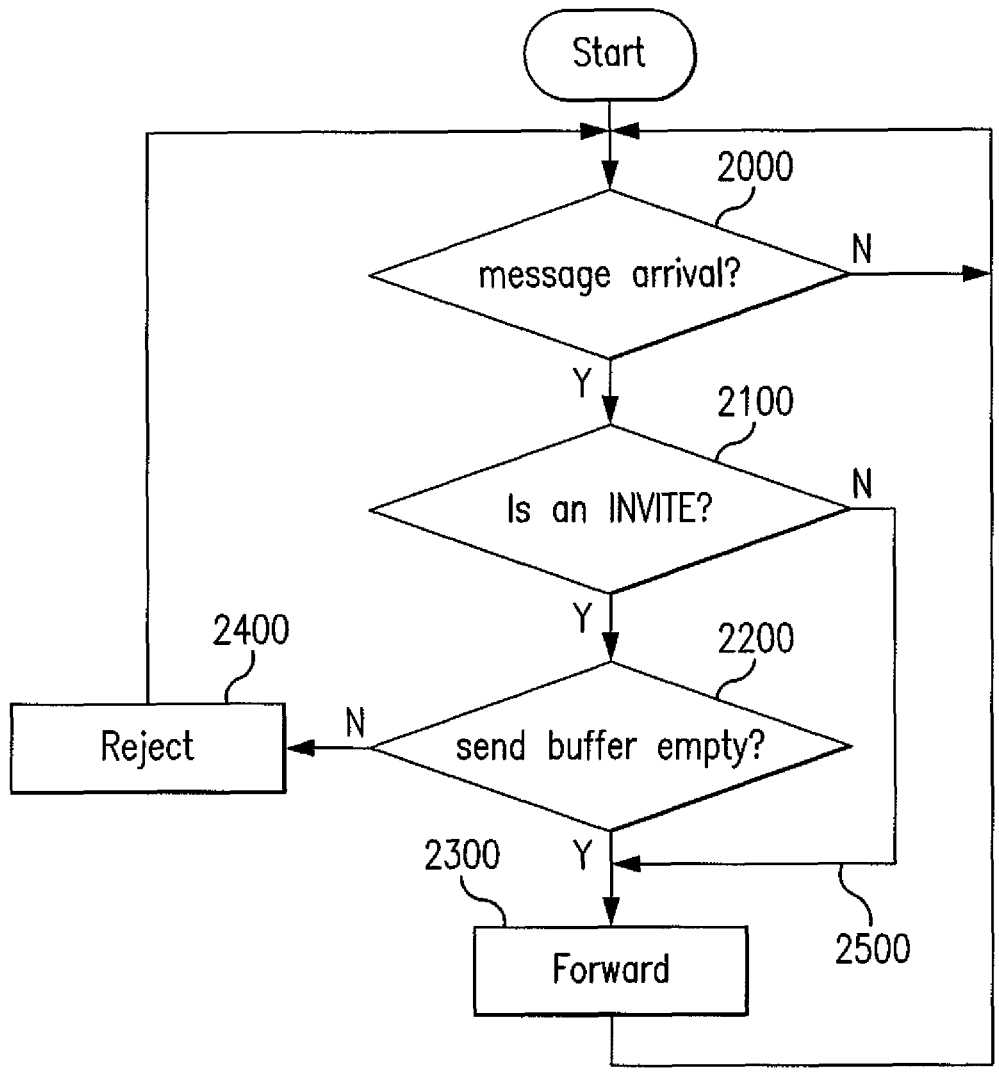
FIG. 6 is a diagram illustrating another method for controlling Session Initiation Protocol (SIP) overload for an INVITE message, according to some embodiments of the disclosed subject matter.

In one embodiment, the message comprises an INVITE or a non-INVITE message and if the message is an INVITE, the forwarding comprises forwarding the INVITE to the receive buffer at the receiving entity if the send buffer is empty of other messages or rejecting the INVITE if the send buffer is not empty of other messages, and if the message is a non-INVITE message, the forwarding comprises forwarding the message to a receive buffer at the receiving entity. For the purpose of illustration and not limitation, FIG. 6 is a diagram illustrating this method for controlling Session Initiation Protocol (SIP) overload for an INVITE message. At 2000, the system (e.g. a processor coupled to the send buffer) checks whether a message has arrived. If a message has arrived, the system checks whether it is an INVITE message at 2100. If it is, the system checks whether the current INVITE connection send buffer is empty at 2200. If yes, then the INVITE is forwarded to the receive buffer of the receiving entity at 2300. If the send buffer is not empty, they system rejects the INVITE at 2400, for example with an explicit SIP rejection message. If the message is not an INVITE, then the message is forwarded to the receive buffer of the receiving entity at 2500.

Figure 7:
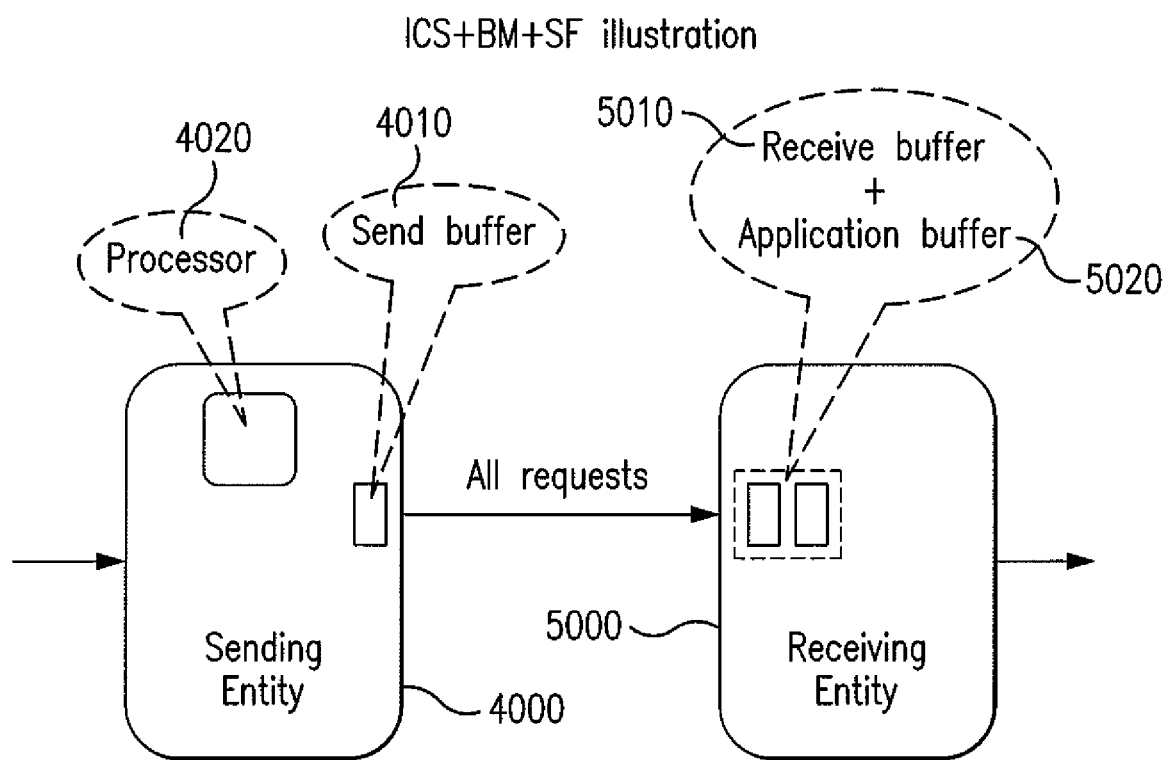
FIG. 7 is a diagram illustrating a system for controlling Session Initiation Protocol (SIP) overload, according to some embodiments of the disclosed subject matter.

In accordance another embodiment of the disclosed subject matter, a system for controlling Session Initiation Protocol (SIP) overload between a sending entity and a receiving entity include a send buffer for receiving a message at the sending entity, and a processor, coupled to the send buffer. The processor is adapted to, in response to receiving the message, cause the send buffer to forward the message to a receive buffer at the receiving entity if the send buffer is empty of other messages or rejects the message if the send buffer is not empty of other messages. For the purpose of illustration and not limitation, FIG. 7 is a diagram illustrating the system for controlling Session Initiation Protocol (SIP) overload. The sending entity, 4000, includes a send buffer 4010 and a processor 4020. The receiving entity, 5000, includes a receive buffer 5010 and an application buffer 5020. The processor 4020 is coupled to the send buffer 4010 and is adapted to, in response to receiving the message, cause the send buffer 4010 to forward the message to the receive buffer 5010 at the receiving entity 5000 if the send buffer 4010 is empty of other messages. Otherwise the processor will cause the send buffer 4010 to reject the message.

In accordance another embodiment of the disclosed subject matter, one or more computer readable media for performing a method of controlling Session Initiation Protocol (SIP) overload between a sending entity and a receiving entity includes receiving a message at a send buffer at the sending entity and forwarding the message to a receive buffer at the receiving entity if the send buffer is empty of other messages or rejecting the message if the send buffer is not empty of other messages. The computer readable media can have any of the features described herein for the method or system for controlling SIP overload.

EXAMPLES

Examples testing the default SIP-over-TCP overload performance were conducted using the Open SIP Server (OpenSIPS) version 1.4.2, a freely-available, open source SIP proxy server. OpenSIPS is a fork of OpenSER, which in turn is a fork of SIP Express Router (SER). These sets of servers represent the de facto open source version of SIP server, occupying a role similar to that of Apache for web server. All these SIP servers are written in C language, use standard process-based concurrency with shared memory segments for sharing state, and are considered to be highly efficient. Examples of the overload control mechanisms in accordance with the disclosed subject matter were also conducted on the OpenSIPS server.

The widely used open source tool, SIPp (May 28th 2009 release) was used to generate SIP traffic, and corrections to SIPp were made for the test cases. For example, the existing SIPp implementation did not enable the 200 OK retransmission timer over TCP as required by the SIP specification, and therefore it was added.

In the examples, the overloaded SIP RE server had 2 Intel Xeon 3.06 GHz processors with 4 GB RAM. However, only one processor was used for the examples. Up to 10 machines for SEs and up to 10 machines for UACs were used. All the SE and UAC machines either had 2 Intel Pentium 4 3.00 GHz processors with 1 GB memory or 2 Intel Xeon 3.06 GHz processors and 4 GB RAM. The server and client machines communicated over copper Gigabit or 100Mbit Ethernet. Typical round trip time measured by the ping command between the machines was around 0.2 ms. All machines used Ubuntu 8.04 with Linux kernel 2.6.24.

A suite of Perl and Bash scripts were written to automate running the experiments and analyzing results. The test load pattern was the same as shown in FIG. 1. For simplicity but without affecting the evaluation purpose, call holding time and media were not included. That means the UAC sent a BYE request immediately after sending an ACK request. In addition, time between the ringing and the actual pick-up of the phone was not considered. Therefore, the UAS sent a 200 OK response immediately after sending a 180 Ringing response. The main performance metrics included server throughput, which reflects the per-second number of sessions successfully set up by receiving the ACK to 200 OK at UAS. The Post Dial Delay (PDD) was also examined, which corresponds to the time from sending the first INVITE to receiving the 200 OK response. A number of other metrics such as CPU utilization and server internal message processing rate were also used in explaining the results.

Example 1

Default SIP Over TCP Overload Performance

Figure 8:
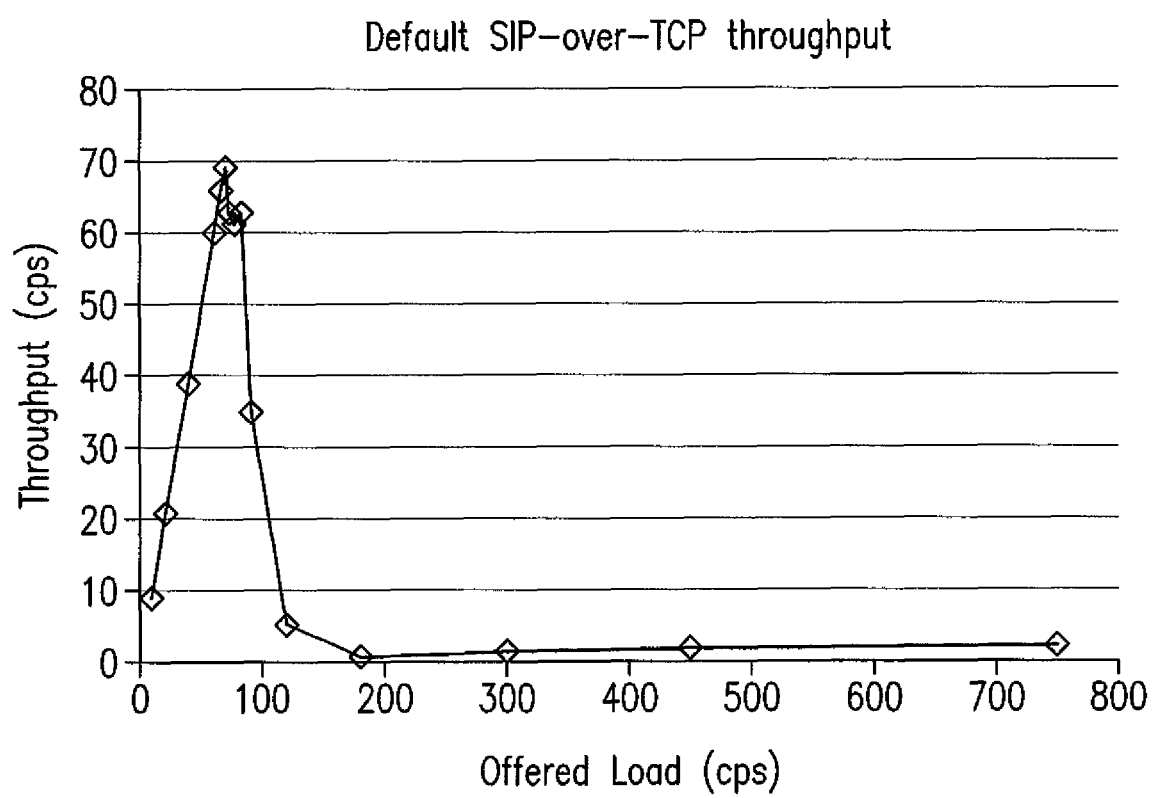
FIG. 8 is a chart showing default SIP-over-TCP throughput.
Figure 9A:
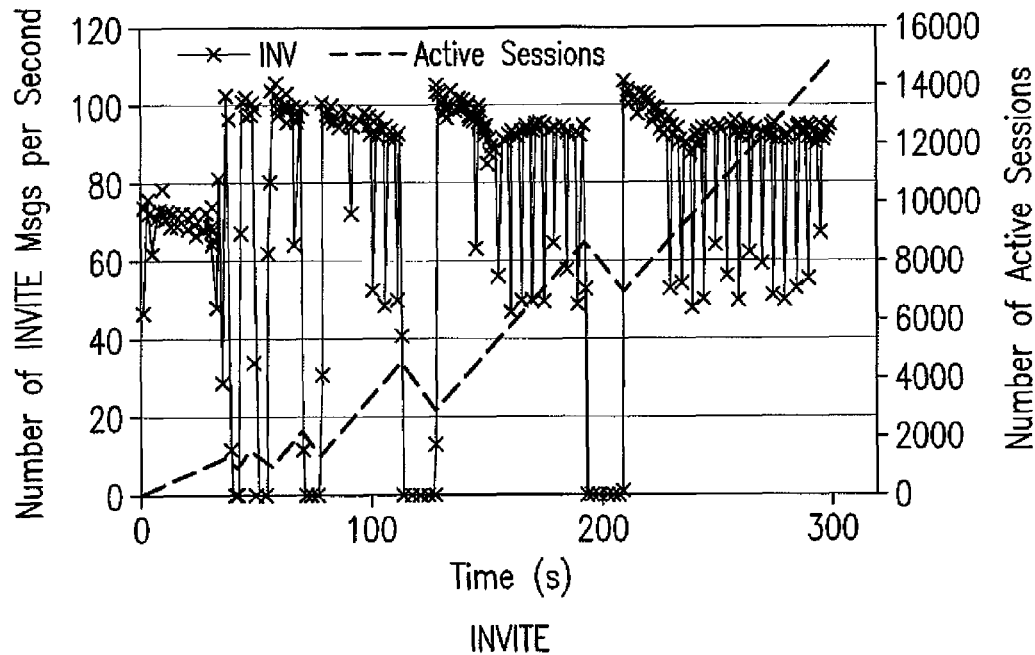
FIGS. 9A, 9B, 9C, and 9D are a series of charts showing RE message processing rates and the number of active sessions in default SIP-over-TCP testing.
Figure 9B:
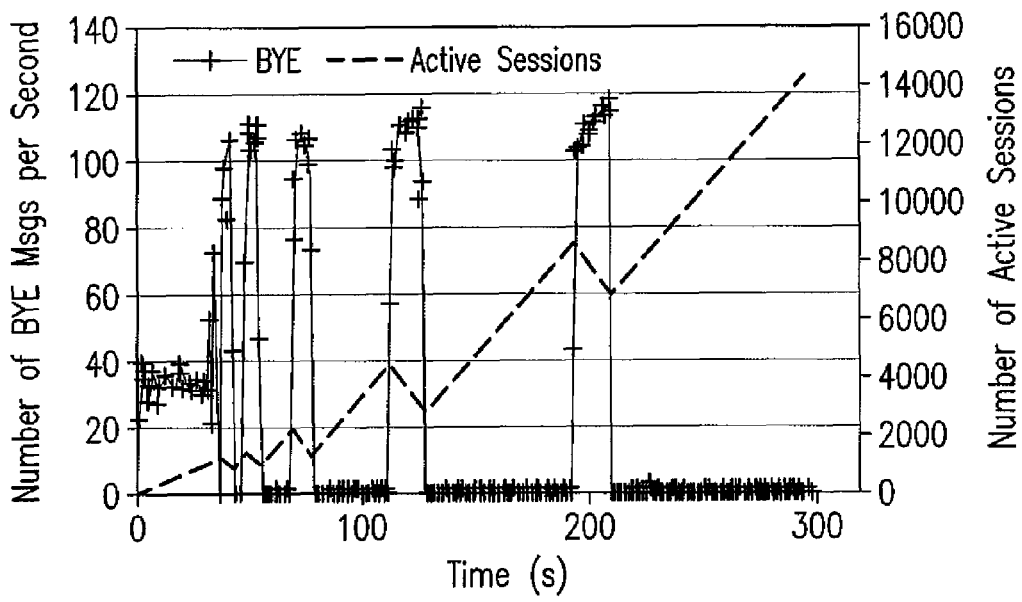
Figure 9C:
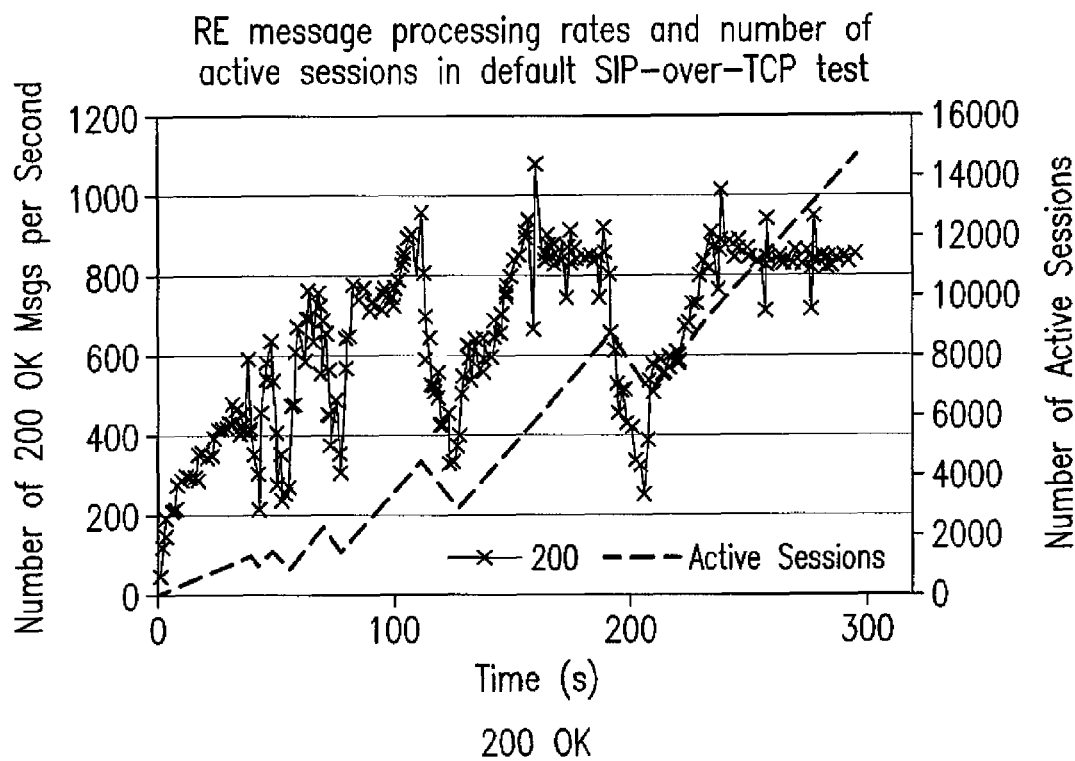
Figure 9D:
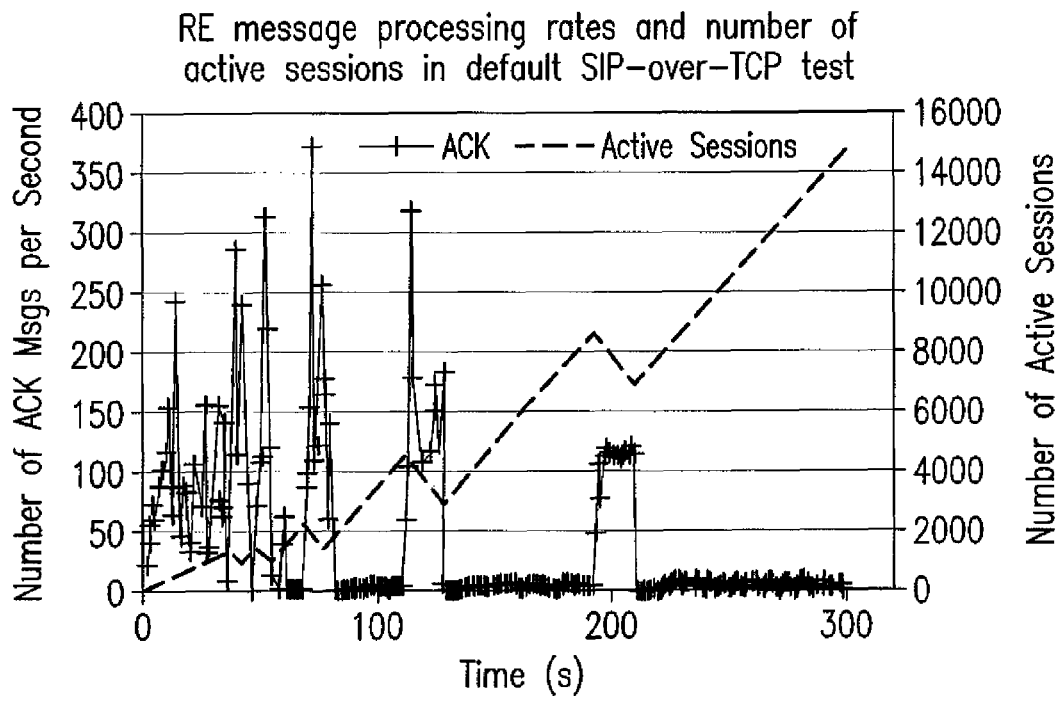

The first evaluation began with a single SE-single RE testbed with all out-of-the-box configurations. The throughput is shown in FIG. 8, which demonstrates that the throughput immediately collapsed as the load approached and exceeded the server capacity. The detailed causes of this behavior was studied through server instrumentation, as described below.

A particular run at a load of 150 cps, which is about 2.5 times the server capacity, was examined. FIG. 9 depicts the per second message processing rate. The four figures show INVITE, BYE, 200 OK and ACK, respectively. It should be noted that the number of 180 Ringings, not shown in these figures, basically follows the number of INVITEs processed, because the UAS is not overloaded and can always deliver responses to RE. For the same reason, the number of 200 OKs to BYEs, which are also not shown, follow the number of BYEs. Along with the individual message processing rates, FIG. 6 also includes the current number of active sessions in the RE. The active sessions are those sessions that have been started by an INVITE but have not yet received a BYE. Since the call holding time is zero, in an ideal situation, any started sessions should be terminated immediately, leaving no session outstanding in the system. In a real system, the number of active sessions could be greater than zero. The larger the number of such in-progress sessions, the longer the delay that those sessions will experience.

FIG. 9 indicates that 200 OK retransmission happened almost immediately as the test started, which means the end-to-end round trip delay immediately exceeded 500 ms. This was caused by the large buffers at the different stages of the network system, which allowed too many sessions to be accepted. The SIP session load is not atomic. The INVITE request is always first introduced into the system and then the responses and follow-up ACK and BYE requests follow. When too many INVITEs are admitted to the system, the BYE generation rate cannot keep up with the INVITEs, resulting in a large number of active sessions in the system and also a large number of messages queued in various stages of the buffers. These situations translate to prolonged delays in getting the ACK to 200 OK to the UAS. More specifically, assuming the server's capacity is 65 cps, if the sessions are indeed atomic, each session will take a processing time of 15.4 ms. In order to avoid 200 OK retransmission, the end-to-end one-way delay cannot exceed 250 ms, corresponding to a maximum of about 16 active sessions in the system. Factoring in the non-atomic nature of the session load, this maximum limit could be roughly doubled to 32. But the default system configuration has a 16 KB TCP socket send buffer, and 64 KB socket receive buffer, as well as 64 KB SIP server application buffer. Considering an INVITE size of around 1 KB, this configuration means the RE can be filled with up to 130 INVITEs at one time, much larger than the threshold of 32. All these INVITEs contribute to active sessions once admitted.

In the test, the number of active sessions reaches 49 at second 2, immediately causing 200 OK retransmissions. 200 OK retransmissions also triggered re-generated ACKs, adding more traffic to the network. This is why during the first half of the time period in FIG. 9, the number of ACKs processed is higher than the number of INVITEs and BYEs processed. Eventually the RE has accumulated too many INVITEs both in its receive buffer and application buffer. So its flow control mechanism starts to advertise a zero window to the SE, blocking the SE from sending additional INVITE requests. Subsequently the SE stops processing INVITE requests because of the send block to the RE. This causes SE's own TCP socket receive buffer and send buffer to get full as well. The SE's flow control mechanism then starts to advertise a zero window to UAC. This back pressure on UAC prevents the UAC from sending anything out to the SE. Specifically, the UAC can neither generate new INVITE requests, nor generate more ACK and BYEs, but it could still receive responses. When this situation happens, retransmitted 200 OKs received can no longer trigger retransmitted ACKs. Therefore, the number of ACKs processed in the later half of the graph does not exceed the number of INVITEs or BYEs. The number of ACKs becomes actually similar to the number of BYEs because BYEs and ACKs are generated together at the same time in our workload.

It can further be seen that under the default settings, the INVITE and BYE processing tends to alternate with gradually increasing periods as the test proceeds. During each period, the INVITE portion is increasingly larger than the BYE portion. Since the number of active sessions always increases with INVITE processing, and decreases with BYE processing, those processing patterns lead to the continued growth of the number of active sessions in the RE and exacerbate the situation.

Figure 10:
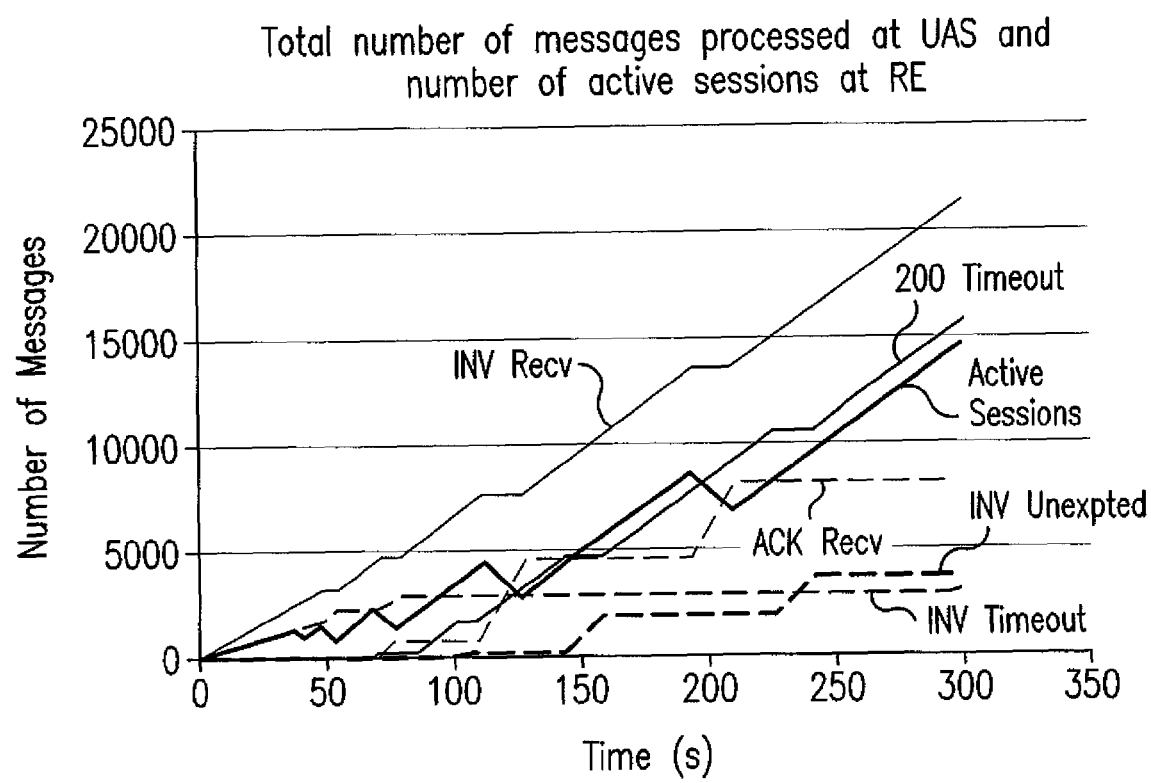
FIG. 10 is a chart showing the total number of messages processed at UAS and the number of active sessions at the RE for default SIP-over-TCP testing.

In addition to observing the per-second message processing rate at RE, the behavior is also confirmed from the total number of messages processed at the UAS, along with the number of active sessions at RE as in shown FIG. 10. Note that the number of INVITEs received, 180 Ringing and initial 200 OK (not retransmissions) messages sent are the same, because 180 Ringing and 200 OK are generated by UAS immediately upon receiving an INVITE. Similarly the number of ACK, BYE, and 200 OK to BYEs are the same, because ACK and BYE are generated at the same time at the UAC and 200 OK to BYE is immediately generated upon receiving BYE at the UAS. In FIG. 10, initially between 0 and the 38th second, the number of ACK and BYEs received are roughly half of the total INVITEs received. Therefore, the number of active sessions in the RE and the number of ACKs received at the UAS are roughly the same. Then RE enters the abnormal INVITE processing and BYE processing alternating cycle. During the period when RE is processing ACKs and BYEs, the number of active sessions decreases. During the period when RE is processing INVITEs, no ACKs are forwarded, so the number of ACKs remains constant.

200 OK retransmission starts at second 2. The total period of 200 OK retransmission lasts 32 seconds for each individual session, therefore the expiration of the first session that has exhausted all its 200 OK retransmissions without receiving an ACK happens at the 34th second. The actual 200 OK retransmission timeout seen in FIG. 10 is at the 66th second. The difference between the 66th and 34th second is 32 seconds, which is a configured maximum period UAS waits to receive the next message in sequence, in this case the ACK to 200 OK.

Starting from the 69th second, a category of messages called INVITE Unexpected is seen. These are indeed ACKs and BYEs that arrive after the admitted sessions have already timed out at the UAS. Note that the number of active sessions still sees a decrease although those processed BYEs are for sessions that have expired, this is because the RE active session statistics merely records the difference between the total number of INVITEs and BYEs processed without taking delay into consideration. These ACKs and BYEs without a matching session also create session states at the SIPp UAS, which normally expect a session message sequence beginning with an INVITE. Since those session states will not receive other normal in-session messages, at the 101th second, or after the 32 seconds UAS receive timeout period, those session states start to time out, reflected in the figure as the INVITE Timeout curve. Finally, a very important overall observation from FIG. 10 is that at a certain point, the 77th second, the number of timely received ACKs virtually stopped growing, causing the throughput to drop to zero.

The final screen logs at the UAC and UAS side for the test with default configurations are shown in FIG. 11, where status code 202 is used instead of 200 to differentiate the 200 OK to BYE from the 200 OK to INVITE. The 200 OK retransmissions, 200 OK timeouts, INVITE timeouts, and INVITEs unexpected messages were explained above. It can be seen that among the 25,899 INVITEs received at the UAS side, 22,078 eventually time out and only 3,821 receive the final ACK. The UAC actually sends out a total of 10,106 ACKs and BYEs. The remaining 6,285 ACKs and BYEs are indeed delivered to UAS but are too late when they arrive, therefore those BYEs do not trigger 202 OK and 6,285 202 OK timeouts are seen at the UAC. At the UAS side, those 6,285 ACKs and BYEs establish abnormal session states and eventually time out after the 32 s receive timeout for INVITE. The unexpected messages at the UAC side are 408 Send Timeout messages triggered at the SIP servers for the BYEs that do not hear a 202 OK back. Note that the number of those messages (3,567) is smaller than the exact number of BYEs that do not receive 202 OK (6,285). This is because the remaining 2,718 408 Send Timeout messages arrive after the 202 OK receive timeout and therefore those messages were simply discarded and not counted in the screen log.

Figure 12:
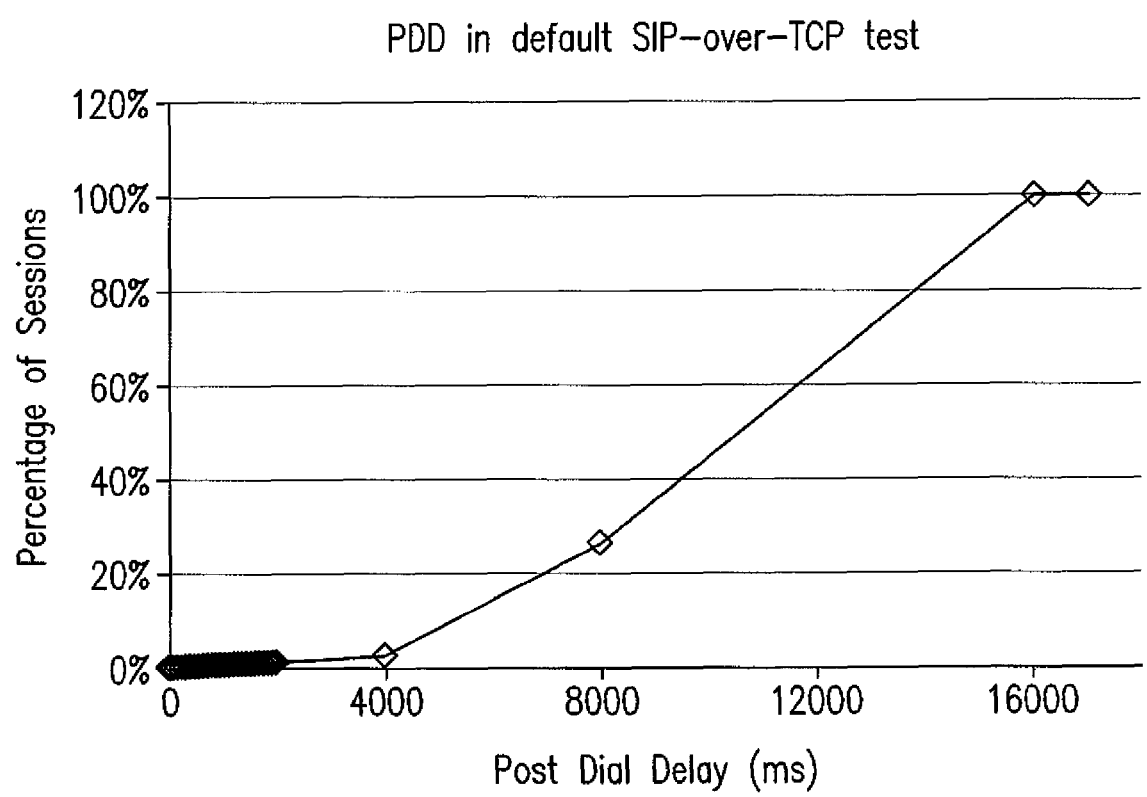
FIG. 12 is a chart showing the PDD for default SIP-over-TCP testing.

The PDD is shown in FIG. 12. Even if it is not considered whether the ACK are delivered to complete session setup, the results show that 73% of the INVITEs have a PDD between 8 and 16 seconds, which is most likely beyond the human interface acceptability limit. Another 24% have a PDD between 4 to 8 seconds, which might be at the boundary of the acceptable limit.

Example 2

Explicit Connection Split, Buffer Minimization and Smart Forwarding (ECS+BM+SF)

Figure 13:
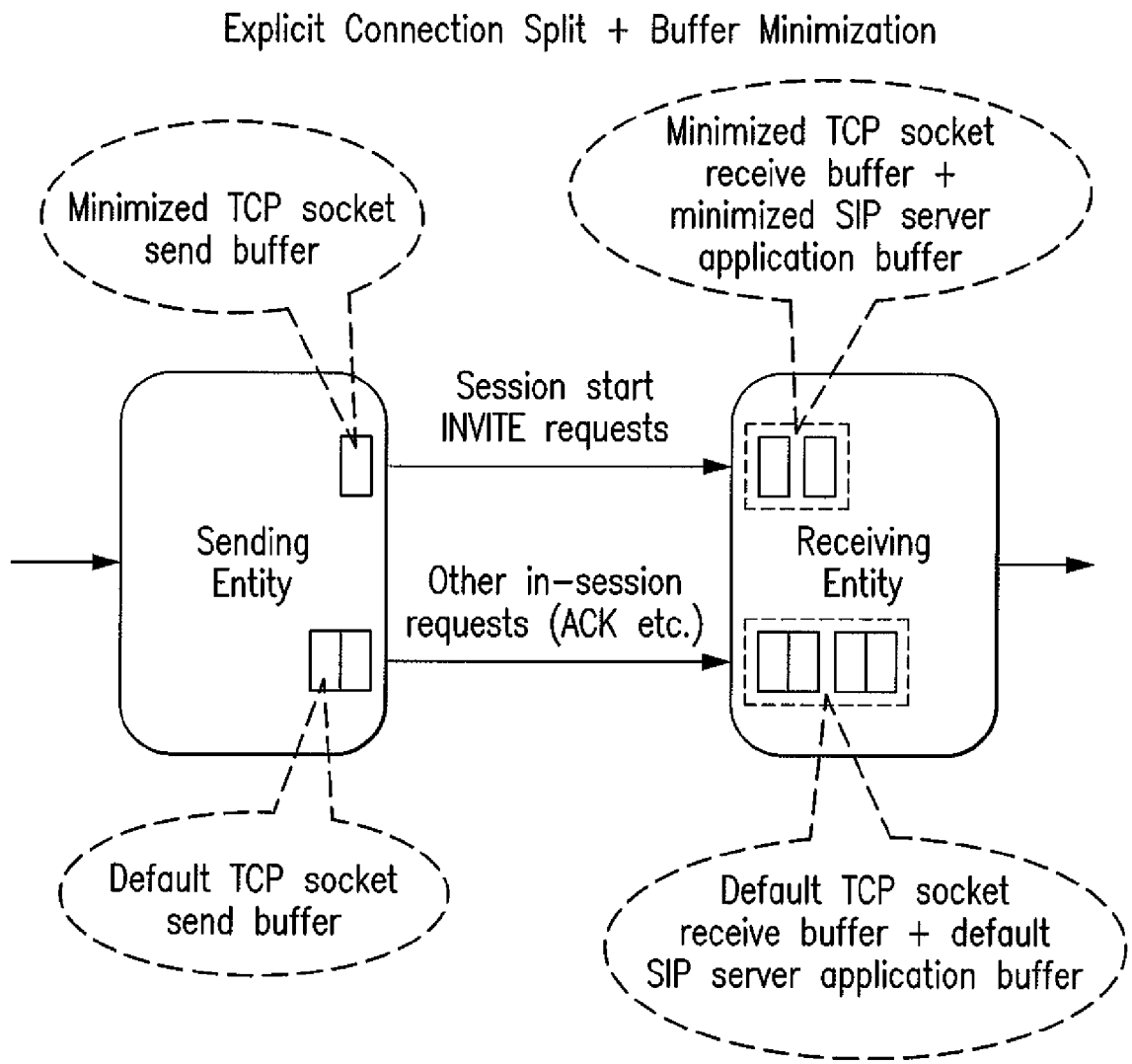
FIG. 13 is a diagram illustrating the explicit connection split and buffer minimization, according to some embodiments of the disclosed subject matter.

First, the number of INVITEs should be limited, but the number of non-INVITEs should not be limited to avoid dropping messages for sessions already accepted. In order to have a separate control of INVITEs and non-INVITE messages, the TCP connection from SE to RE is split into two: one for INVITE requests, and the other for all other requests. Second, in order to limit the number of INVITEs in the system and minimize delay, the total system buffer size between the SE and the RE is minimized for the INVITE connection, which should include three parts: the SE TCP socket send buffer, the RE TCP socket receive buffer and the RE SIP server application buffer. The resulting mechanism is called Explicit Connection Split+Buffer Minimization (ECS+BM) and is illustrated it in FIG. 13.

Although ECS+BM effectively limits the number of INVITEs that could accumulate at the RE, the resulting throughput differs no much from that of the default configuration. The reason is that, since the number of INVITEs the SE receives from UAC remains the same and the INVITE buffer sizes between SE and RE are minimized, the INVITE pressure merely moves a stage back and accumulates at the UAC-facing buffers of the SE. Once those buffers, including the SE receive buffer and SE SIP server application buffer, have been quickly filled up, the system delay dramatically increases. Furthermore, UAC is then blocked from sending to SE and unable to generate ACKs and BYEs, causing the number of active sessions in the RE to skyrocket.

In order to release, rather than pushback, the excessive load pressure present in the ECS+BM mechanism, the Smart Forwarding (SF) algorithm as described above and as shown in FIG. 5 is introduced. This algorithm is enforced only for the INVITE connection. When an INVITE arrives, the system checks whether the current INVITE connection send buffer is empty. If yes, the INVITE is forwarded; otherwise the INVITE is rejected with an explicit SIP rejection message. This algorithm has at least two special advantages: first, although any send buffer length threshold value for rejecting an INVITE could be chosen, the decision to use the emptiness criterion makes the algorithm parameter-free; second, implementation of this algorithm is especially easy in Linux systems because the current send buffer occupancy can be retrieved by a simple standard ioctl call.

Figure 14:
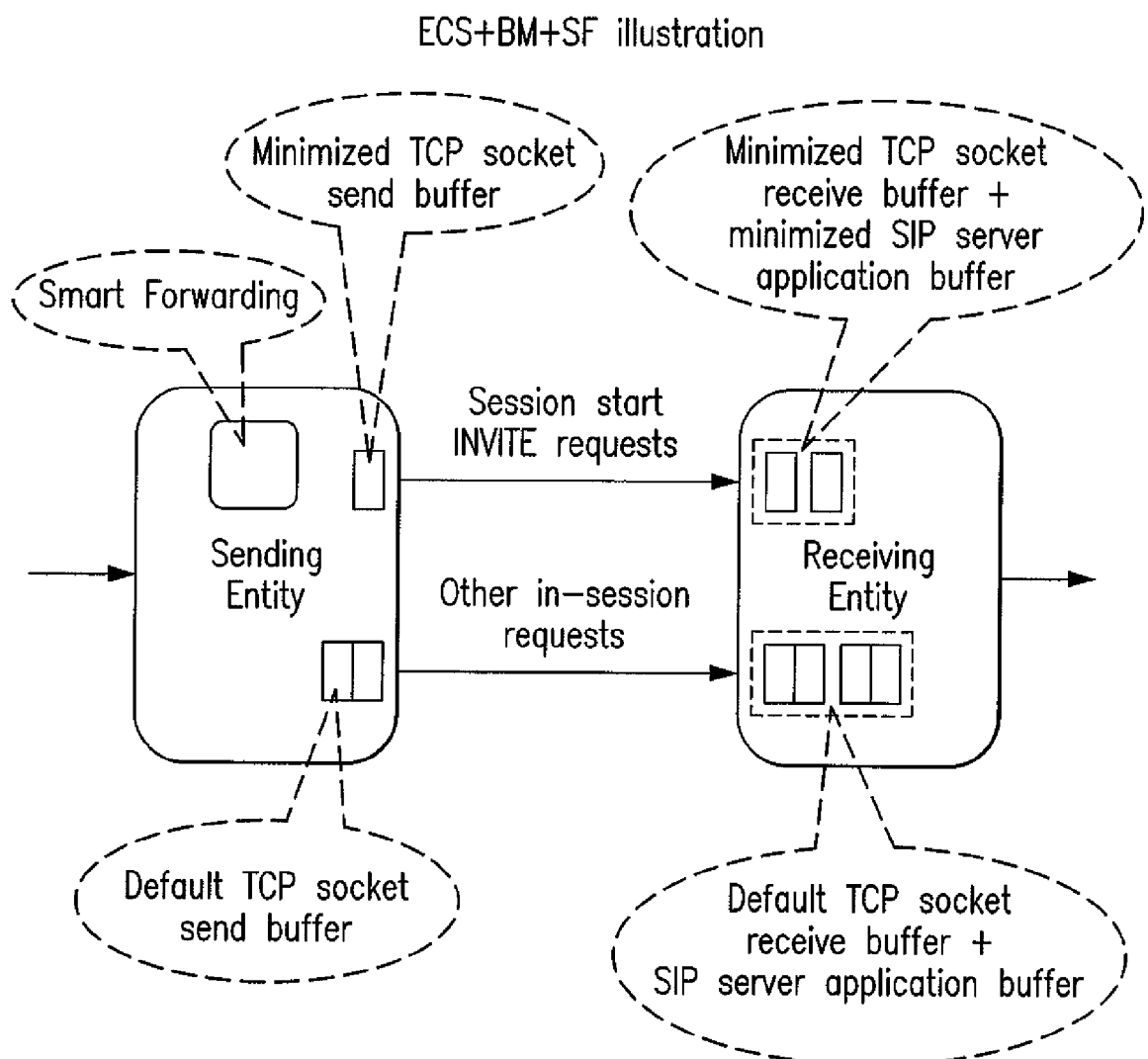
FIG. 14 is a diagram illustrating the explicit connection split, buffer minimization, and smart forwarding, according to some embodiments of the disclosed subject matter.

The resulting mechanism is then ECS+BM+SF, which is illustrated it in FIG. 14. The RE listens to two separate sockets, one for INVITE requests that start new sessions, the other for other in-session requests, such as ACKs and BYEs. SIP response messages go through the reverse directions of the corresponding connection as usual. The following settings for the special INVITE request connection are used: the SE send buffer size is set to the minimum system-allowed value of 2 KB; the RE side effective TCP socket receive buffer is set to about 1 KB and the RE application buffer size is set to 1,200 bytes. Since the size of an INVITE in the test is about 1K, these configurations allows the RE to hold at maximum one or two active INVITEs at a time.

Figure 15:
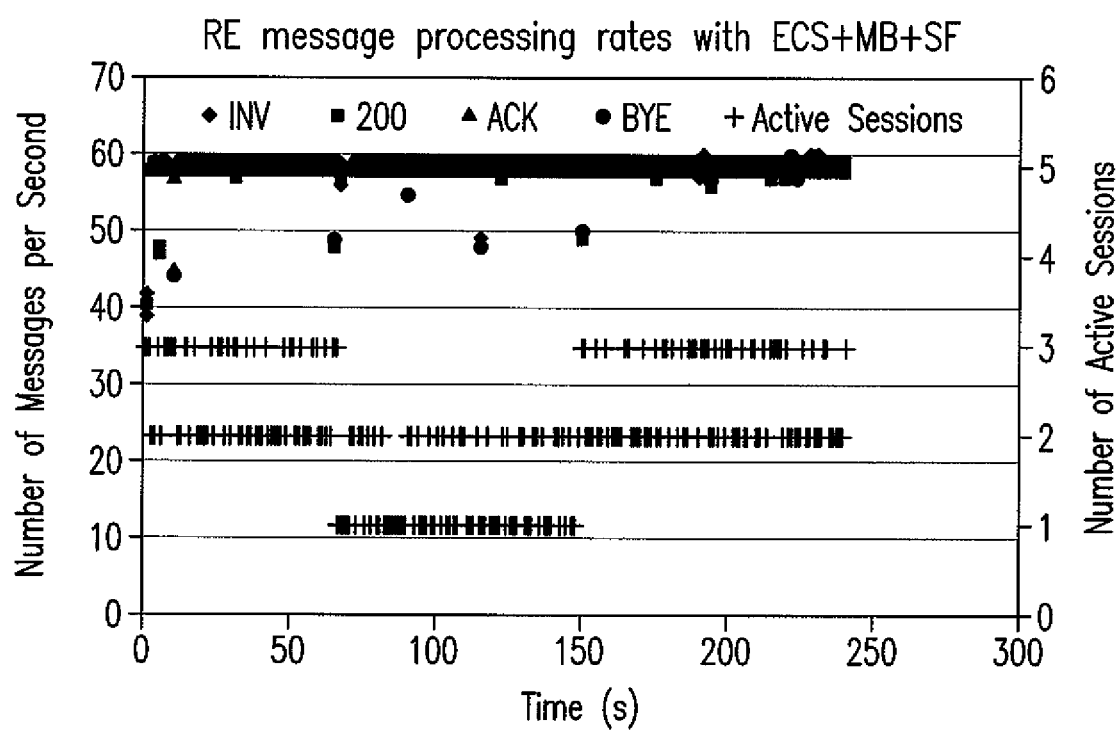
FIG. 15 is a chart illustrating the message processing rates for the system of FIG. 14.
Figure 16:
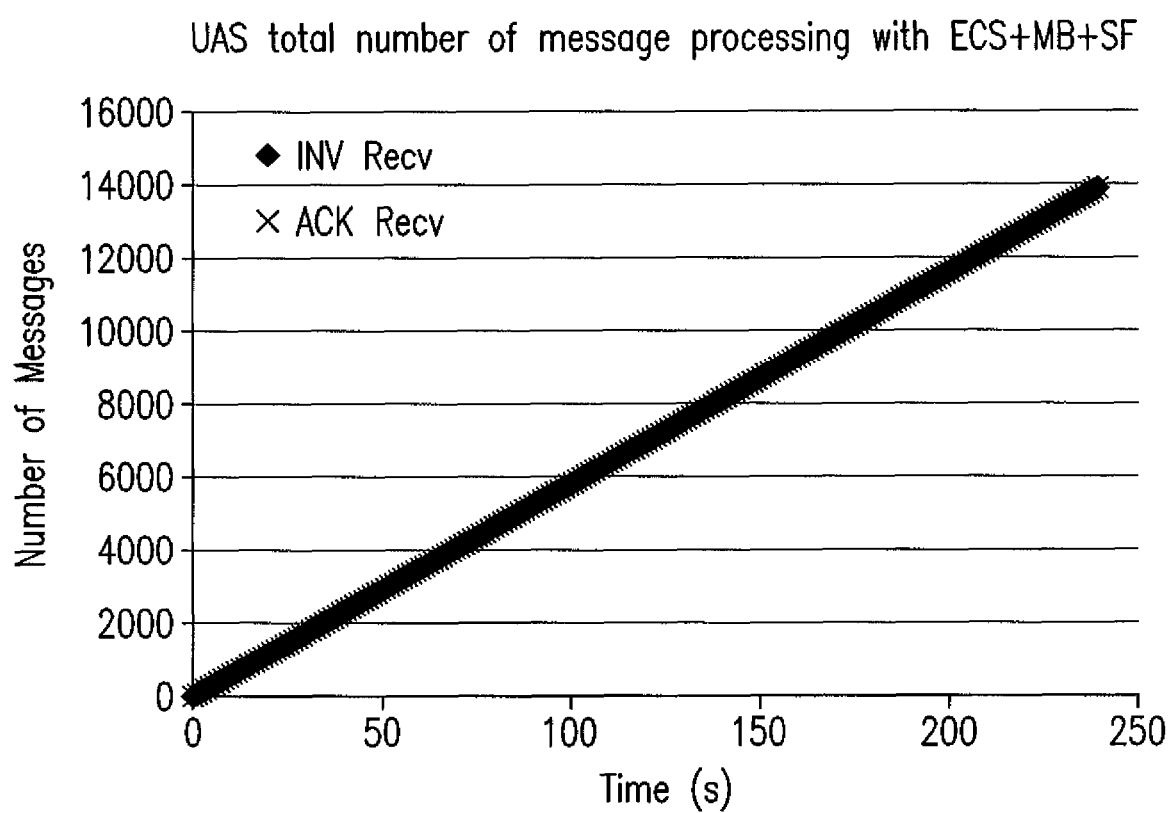
FIG. 16 is a chart illustrating UAS total number of message processing for the system of FIG. 14.

The detailed results of the ECS+BM+SF mechanism are compared with those of the default configuration in the same scenario as described above with one SE overloading an RE at an offered load of 2.5 times the capacity. FIG. 15 shows the average message processing rate and the number of active sessions in the RE. There is a dramatic difference between this figure from FIG. 9. Here, the values of INVITE, 200 OK, ACK, and BYE processing rate overlap most of the time, which explains why the number of active sessions remains extremely low, between 1 and 3, all the time. FIG. 16 shows that the total numbers of INVITEs and ACKs received at the UAS are consistent. The slope of these two overlapping lines corresponds to the throughput seen at the UAS. The throughput value, 58 cps, is smaller than the peak value in FIG. 8 at the same load because this run was obtained with substantial debugging code enabled.

Figure 17:
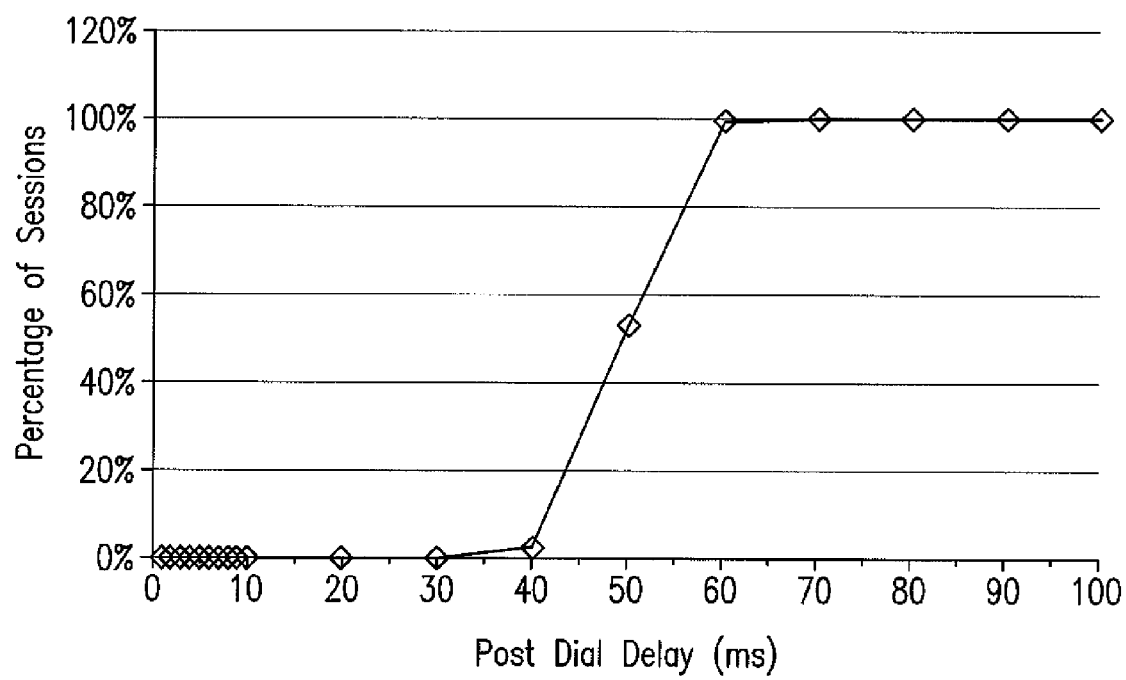
FIG. 17 is a diagram illustrating the PDD for the system of FIG. 14.

The PDD of the test is shown in FIG. 17. As can be seen, none of the delay values exceeds 70 ms, and over 99% of the sessions have a delay smaller than 60 ms. Furthermore, from the overall UAC and UAS screen logs shown in FIG. 18(a) and FIG. 18(b), it can be seen that among the 35,999 INVITEs that are generated, 22,019 of them are rejected by the smart forwarding algorithm. The remaining 13,980 sessions all successfully get through, without triggering any retransmission or unexpected messages—a sharp contrast to FIG. 11. Finally, the system achieves full capacity as confirmed by the full CPU utilization observed at the RE.

Example 3

Implicit Connection Split, Buffer Minimization and Smart Forwarding (ICS+BM+SF)

Figure 19:
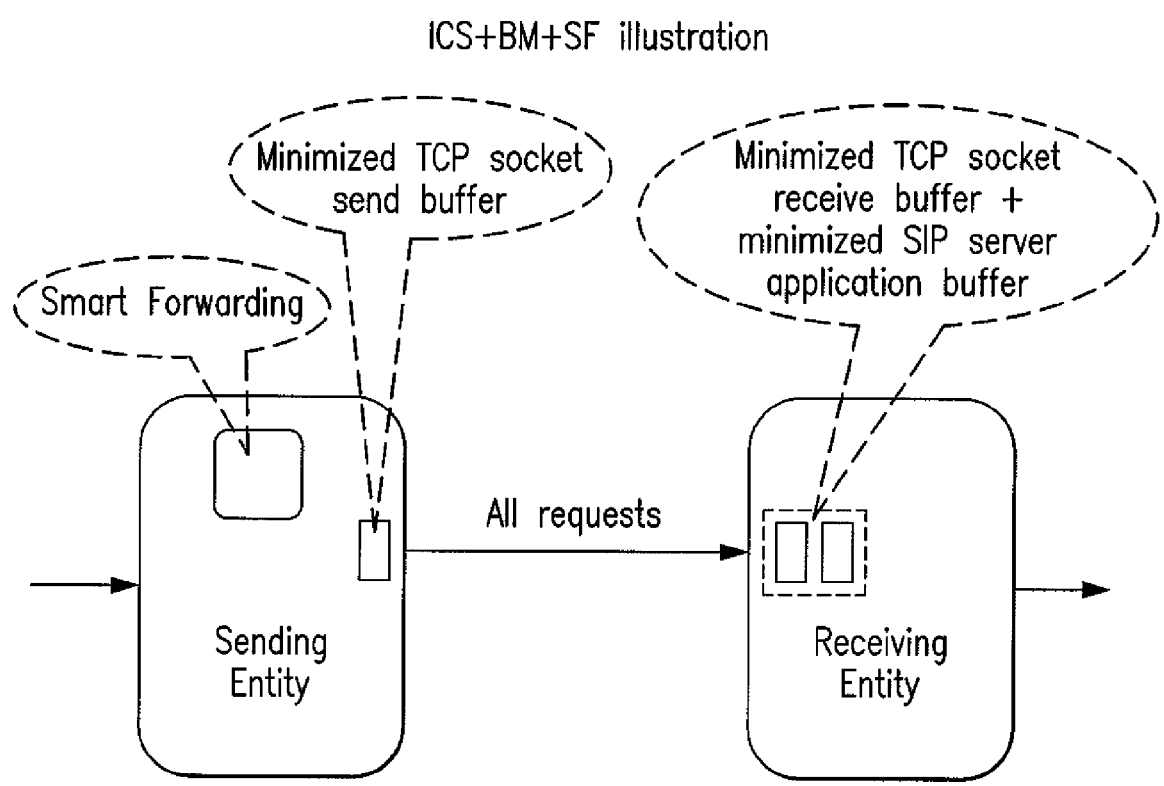
FIG. 19 is a diagram illustrating the implicit connection split, buffer minimization, and smart forwarding, according to some embodiments of the disclosed subject matter.
Figure 20:
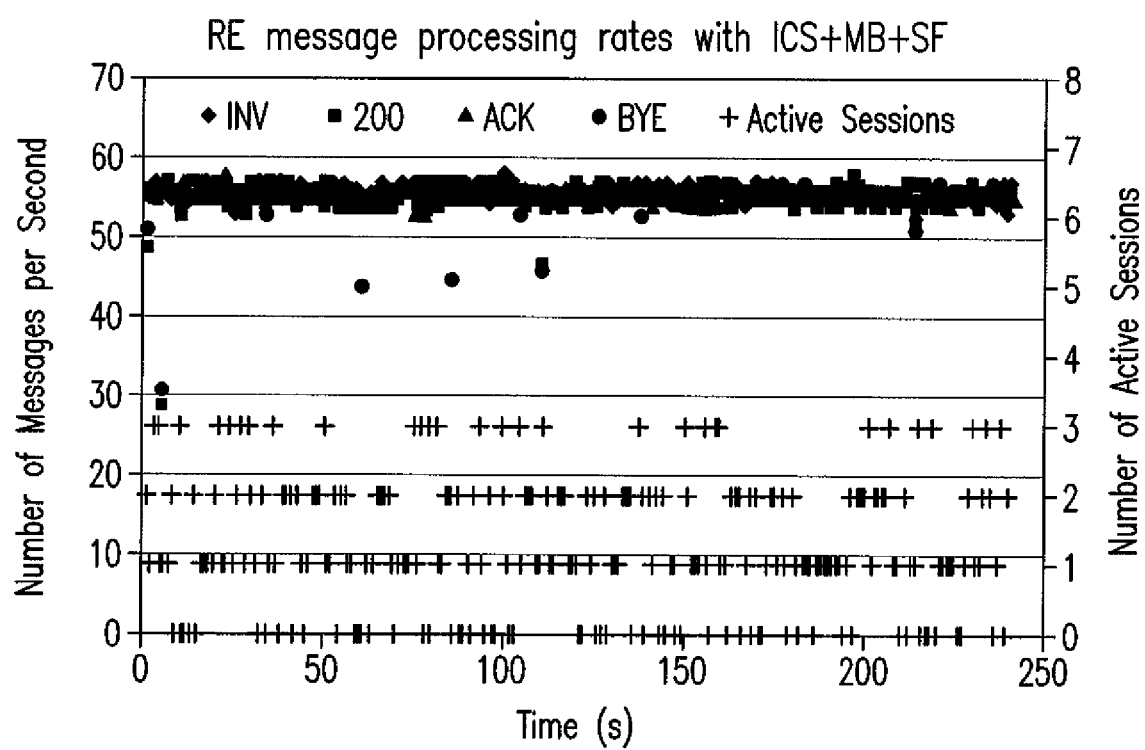
FIG. 20 is a chart illustrating the message processing rates for the system of FIG. 19.
Figure 21:
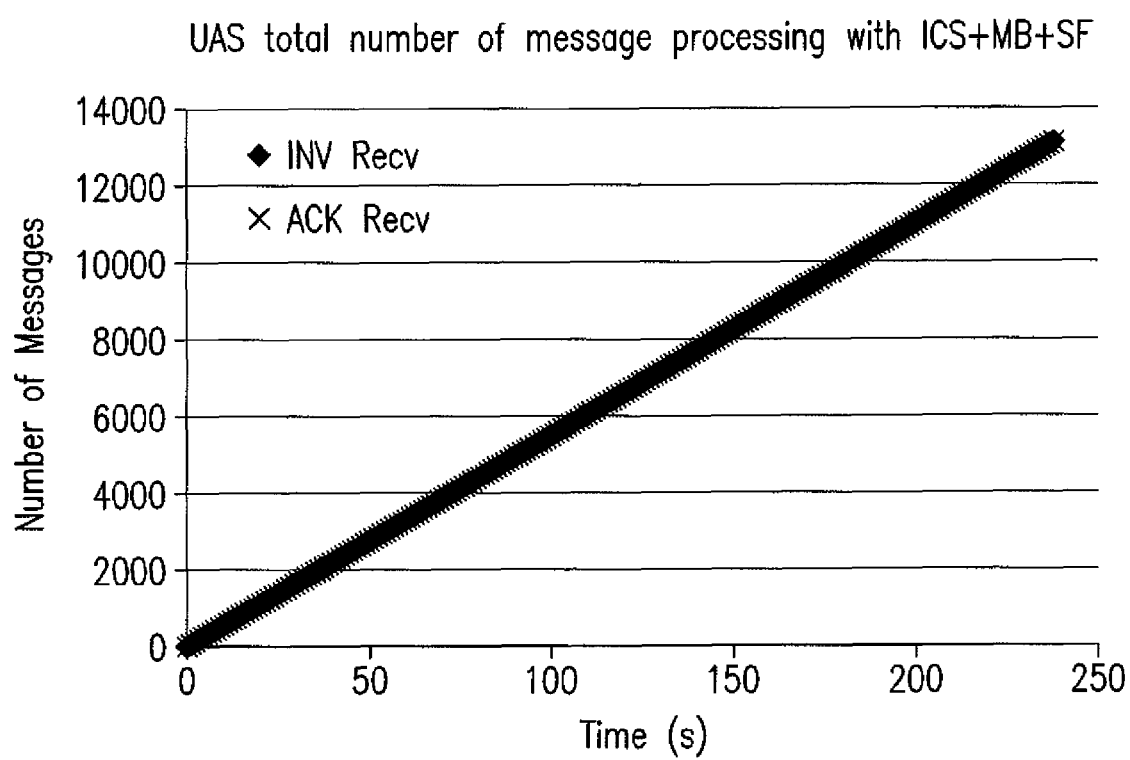
FIG. 21 is a chart illustrating UAS total number of message processing for the system of FIG. 19.

The ECS+BM+SF mechanism described above is effective in restricting load by combining smart forwarding and two separate connections for INVITE and non-INVITE requests, with special buffer minimization techniques applied to the INVITE connection. Because the mechanism works so well in keeping only a few active sessions in the RE all the time, the servers should never be backlogged and therefore the queue size for both INVITE and non-INVITE request connections should be close to zero. In that case, the dedicated connection for non-INVITE requests does not require the default large buffer setting either. Therefore the two split connections can be merged back into one with a minimized SE send buffer, RE receive and application buffer settings. The smart forwarding algorithm is revised accordingly as shown in FIG. 6. Since there is only a single request connection now, the algorithm checks for INVITE requests and rejects it if the send buffer is non-empty. Otherwise, the INVITE is forwarded. All non-INVITE requests are always forwarded. Although the revised mechanism no longer requires a dedicated connection for INVITEs, it treats INVITEs and non-INVITEs differently. Therefore, it is called Implicit Connection Split (ICS) as opposed to the previous ECS. The resulting ICS+BM+SF mechanism is shown in FIG. 19. Running the same overload experiment as described above, we see that the RE average message processing rate shown in FIG. 20 and UAS total message processing shown in FIG. 21 are substantially similar to FIG. 15 and FIG. 16.

Figure 22:
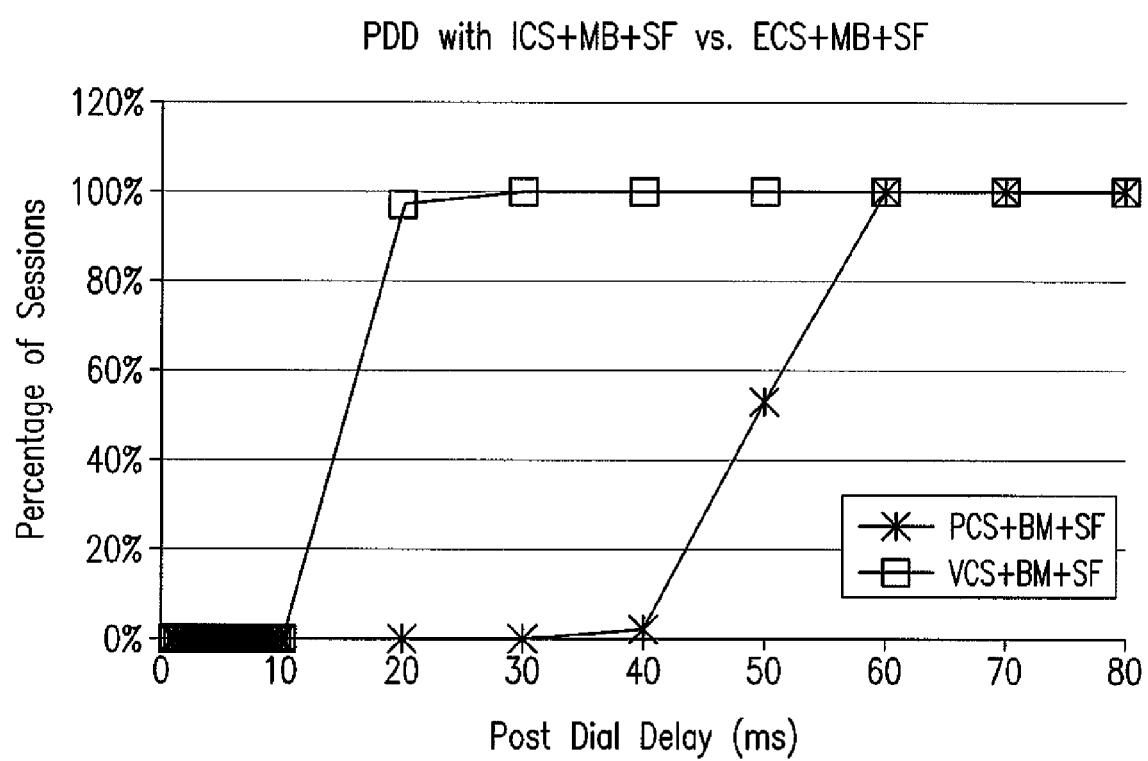
FIG. 22 is a chart illustrating the PDD for the system of FIG. 19.

However, the number of active sessions in the system is between 0 to 3 in ICS as opposed to between 1 to 3 in ECS. This indicates that the ICS mechanism is more conservative in forwarding INVITEs (or more aggressive in rejecting INVITEs) because in ICS INVITEs and non-INVITEs share a single connection and the same buffer space. This will imply that ICS could have a smaller delay but also smaller throughput than ECS. FIG. 22 compares the PDD of ICS and ECS. In ICS, over 99.8% of the sessions have a delay value smaller than 30 ms, much better than ECS where 99% of the session delays are smaller than 60 ms. On the other hand, FIG. 23 shows that ICS successfully admitted 13,257 of the 35,999 INVITEs, only an insignificant 5% fewer than the corresponding number in ECS. Thus ICS combines these results with the advantage of not requiring an explicit connection split.

Example 4

Parameter Tuning

The mechanisms described in the Examples above contain three tuning parameters, the three buffer sizes. In the Examples above, the values were minimized and the SE send buffer was set to 2 KB, RE receive buffer to 1 KB and RE application buffer to 1,200 bytes. The relationship among setting different values of these three buffer sizes is described below:

A. Increasing the RE Side Buffer

Figure 24:
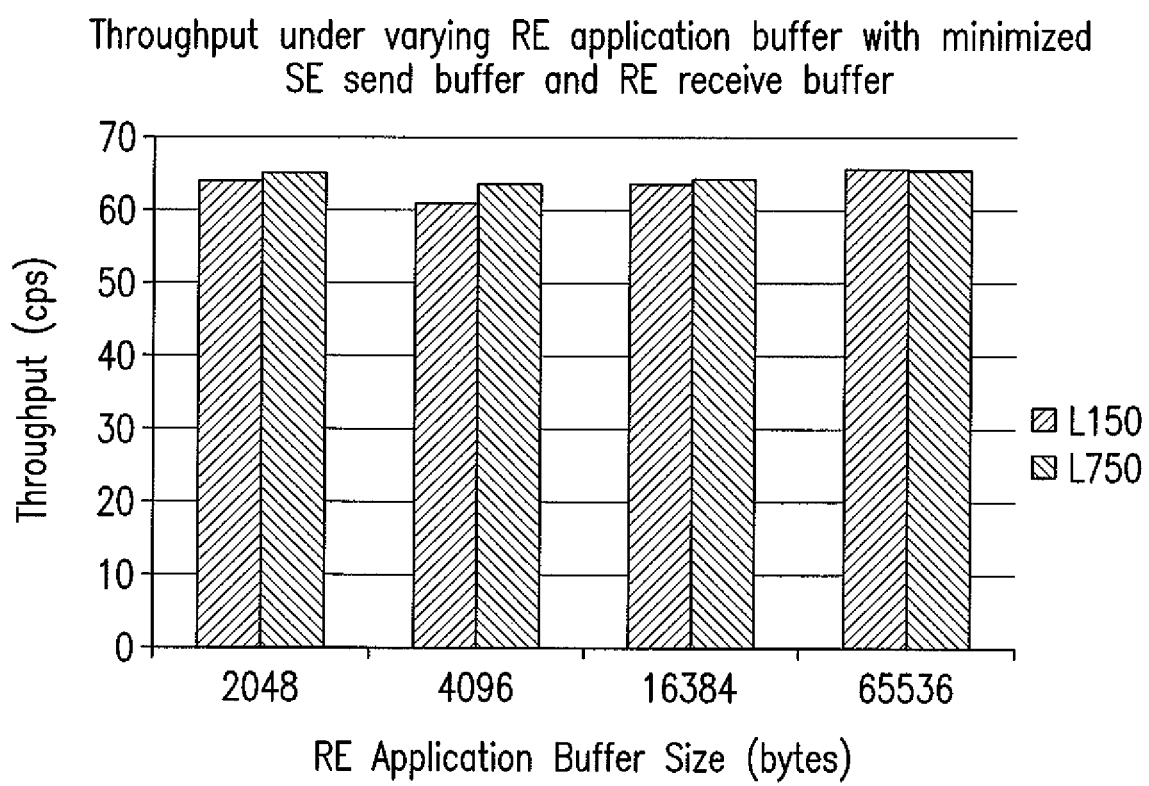
FIG. 24 is a chart illustrating the throughput under varying RE application buffer sizes with minimized SE send buffer and RE receive buffer sizes.

1) Increasing Either the RE Application Buffer or Receive Buffer: First the SE send buffer and RE receive buffer size was kept at their minimized values, and the RE application buffer was increased to determine how it affects performance. The throughput under two load values, 150 cps and 750 cps, the former representing a moderate overload of 2.5 times the capacity and the latter a heavy overload of 12.5 times capacity was tested. The application buffer size was varied at 2 KB, 4 KB, 16 KB, 64 KB. The 64 KB value was the default application buffer size. FIG. 24 shows that the application buffer size does not have a noticeable impact on the throughput. Moreover, the number of 200 OK retransmissions was found to be zero in all the tests, indicating a timely completion of all session setups.

Figure 25:
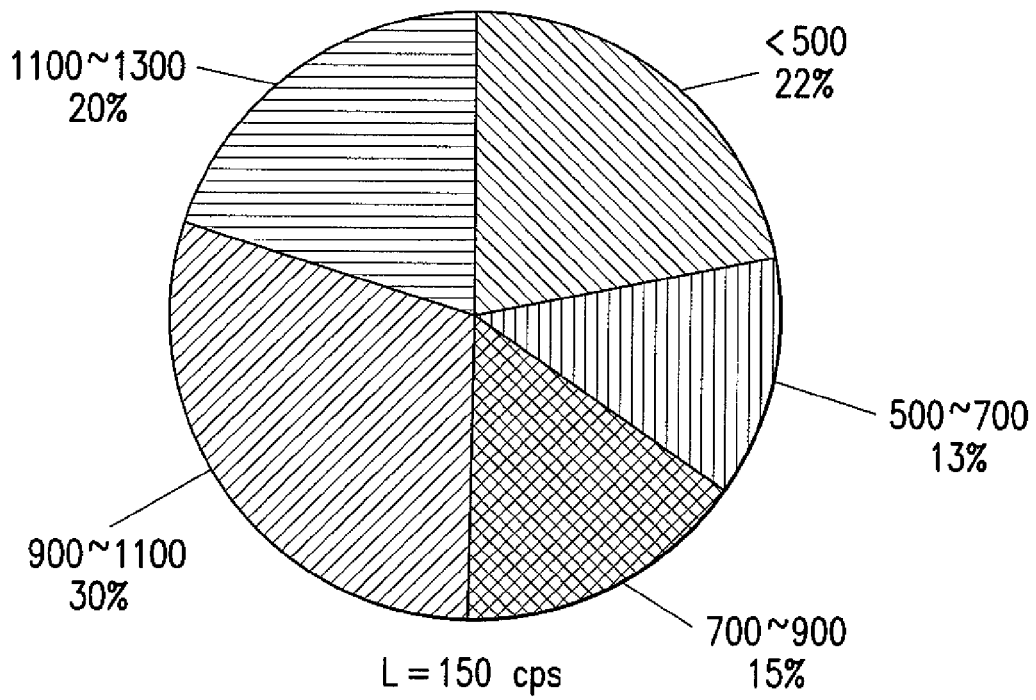
FIG. 25 is a histogram of the RE application buffer reading.
Figure 25:
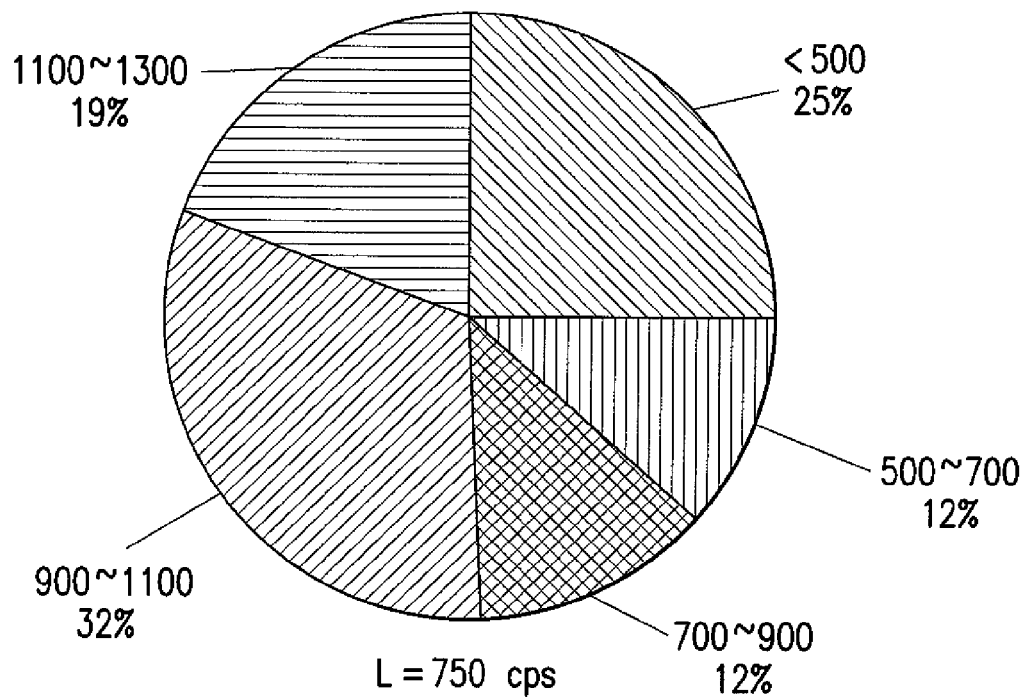

To further illustrate the actual sizes of application buffer used, the histograms of the actual number of bytes the RE reads in each time from the receive buffer was plotted for two tests: with minimized send buffer and receive buffer but default application buffer under load 150 cps and 750 cps. The results in FIG. 25 show that even when the application buffer size is 64 KB, the system almost never reads more than 1,300 bytes. This can be explained by the fact that the number of bytes the application buffer reads are limited by the receive buffer size. Note that in these tests, although the estimated effective receive buffer size is 1 KB, the maximum receive buffer size could be up to 1,360 bytes depending on the actual buffer overhead.

Referring to the message sizes captured by Wireshark at the RE and SE as listed in Table 1 (the differences between the lengths seen at the SE and RE are caused by the serve stripping away or appending certain SIP headers, e.g., the Route and Record-Route headers) and checking the server message log confirms that, most of the time, the bytes read are for a single or a couple of messages which are sent together. For example, since the 180 Ringing and 200 OK messages are sent at the same time, the messages are likely to be read together, which accounts for about 1,233 bytes. Therefore, a larger RE application buffer size actually does not change throughput once the other two buffers are already minimized.

TABLE 1

| Message Type | At SE | At RE |
|---|---|---|
| INVITE | 776 | 941 |
| 100 Trying | 363 | NA |
| 180 Ringing | 473 | 534 |
| 200 OK | 638 | 699 |
| ACK | 425 | 590 |
| BYE | 608 | 773 |
| 202 OK | 356 | 417 |
| Total | 2863 | 3954 |

Figure 26:
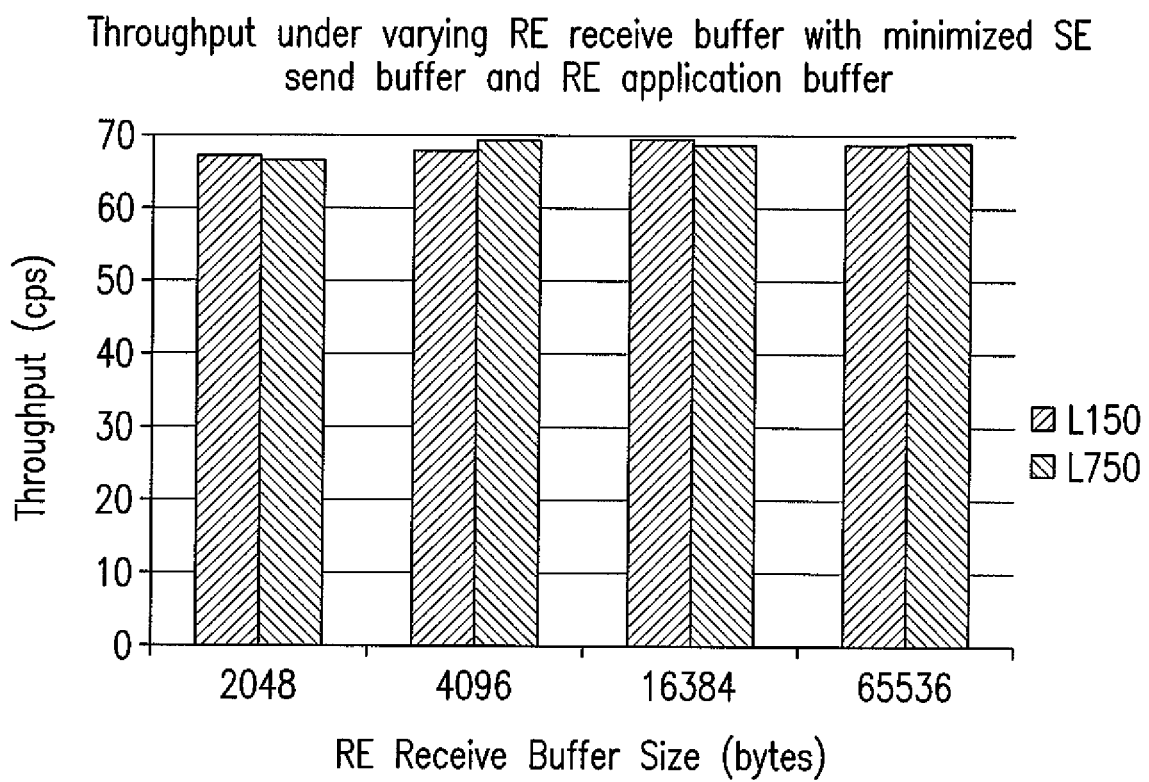
FIG. 26 is a chart illustrating the throughput under varying RE receive buffer sizes with minimized SE send buffer and RE application buffer sizes.

The results in FIG. 26 indicate that when the send buffer and application buffer are minimized, the throughput does not make a difference even when the receive buffer is increased up to its 64 KB default value.

Figure 27A:
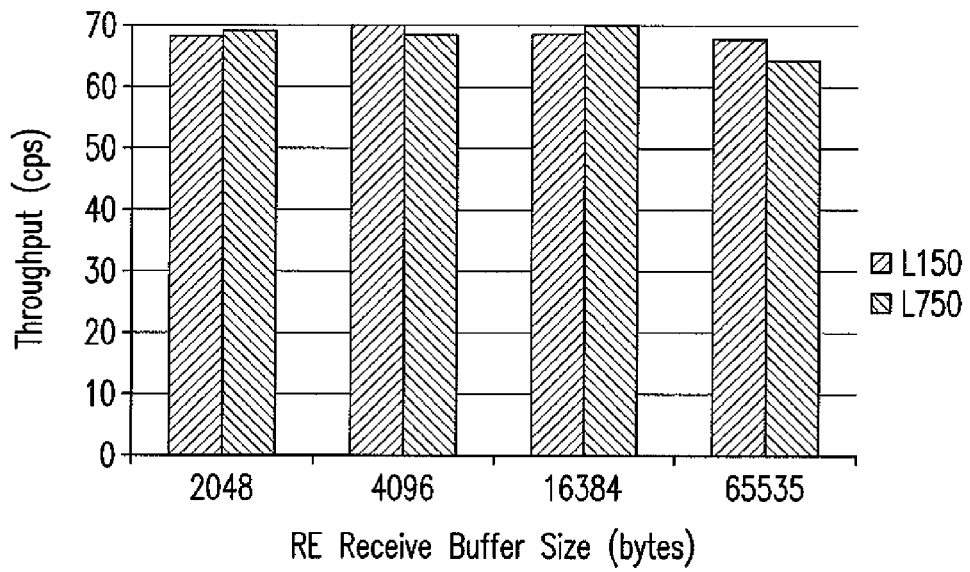
FIG. 27(*a*) is a chart illustrating the throughput under varying RE receive buffer sizes with minimized SE send buffer size and default RE receive buffer size.
Figure 27B:
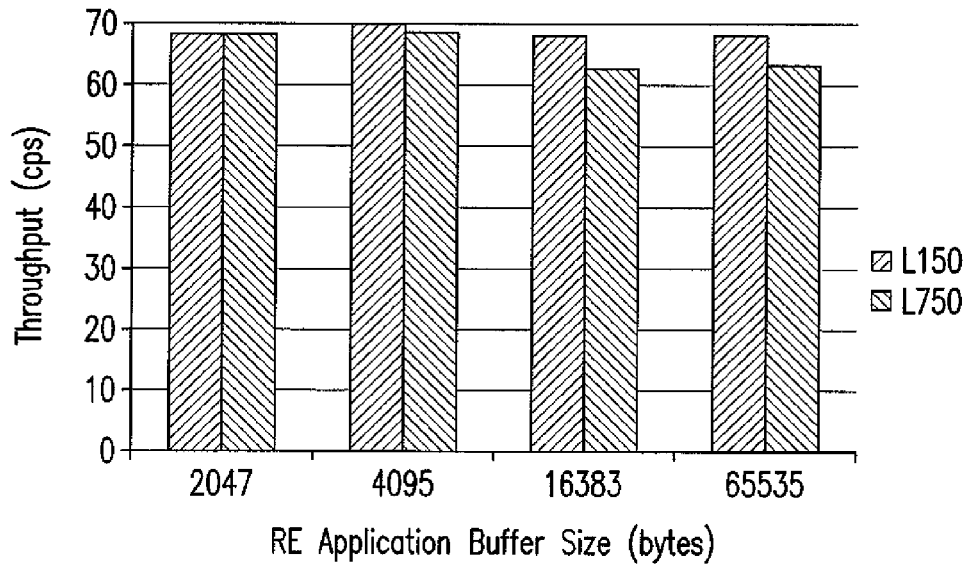

2) Increasing Both RE Receive Buffer and Application Buffer: As described above, keeping either of the RE receive buffer or RE application buffer at its default value, while minimizing the other, maintains throughput. This example tests whether the minimized RE receive buffer or RE application buffer can be further increased while the other one is in its default value. As FIG. 27 shows, the throughputs do remain close to the system capacity at both heavy and moderate overloads those cases.

However, recall that enlarging either RE buffer size could hold messages in the RE and increase queuing delay. The PDD distribution is plotted for four test cases in FIG. 28. Two of those cases compare the delay when the RE application buffer is set to 2 KB vs. the default 64 KB, while the RE receive buffer is at its default value of 64 KB. Most of the delays in the small application buffer case are below 375 ms, and as a result no 200 OK retransmissions are observed at the UAS side. In the large application buffer case, however, nearly 70% of the sessions experience a PDD between 8 seconds and 32 seconds, which will most likely be hung up by the caller even if the session setup messages could ultimately complete. Not surprisingly, a large number of 200 OK retransmissions are also seen in this case.

Figure 28:
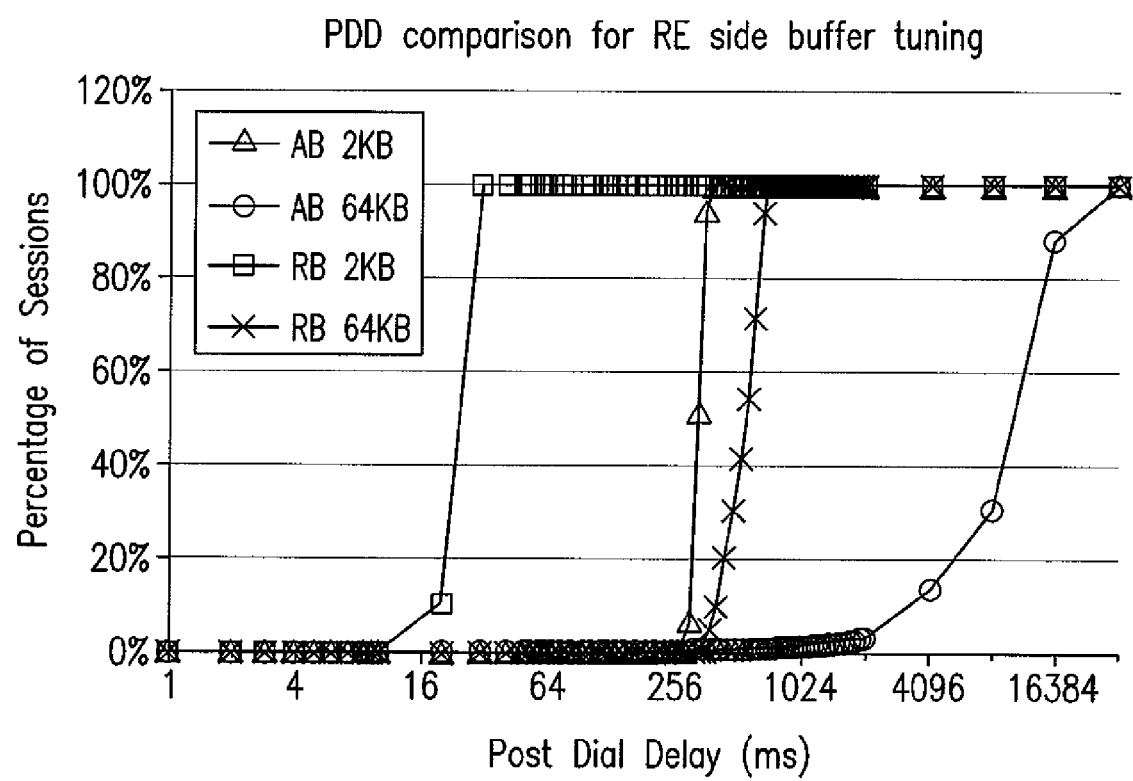
FIG. 28 is a chart illustrating the PDD comparison for RE side buffer tuning.

The other two cases in FIG. 28 compare the PDD when the receive buffer is set to 2 KB vs. the default 64 KB, while the application buffer is at its default value of 64 KB. In the small receive buffer case, over 99.7% of the sessions have a PDD below 30 ms, and there is no 200 OK retransmissions at the UAS side. In the larger receive buffer case, about 30% of the sessions have a PDD below 480 ms, and the rest 70% between 480 ms and 700 ms. Since a large number of sessions experienced a round trip delay exceeding 500 ms, quite a number of 200 OK retransmissions are seen at the UAS side.

To summarize, although throughput is similar by tuning either the RE receive buffer or application buffer, the delay performance could be very different in these two approaches. Specifically, when similar sizes of RE receive buffer or application buffer is used and the other buffer is left at its default value, limiting the receive buffer could produce over a magnitude lower PDDs than limiting the application buffer, which in turn significantly reduces the likelihood of 200 OK message retransmissions. The above results show that since the RE receive buffer and application buffer are connected in series, at least one of them has to be tuned in order to restrict buffering delay, and tuning the receive buffer is preferable over tuning the application buffer because limiting the receive buffer produces more timely transport feedback than limiting the application buffer.

B. Increasing SE Side Buffer

Figure 29:
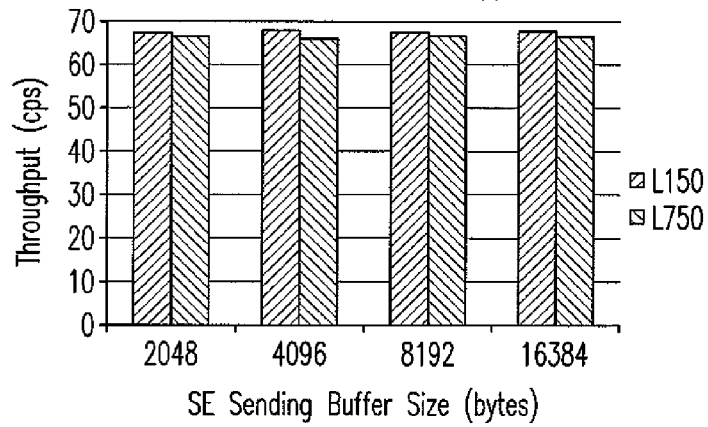
FIG. 29 is a chart illustrating throughput performance under varying SE sending buffer sizes.
Figure 29:
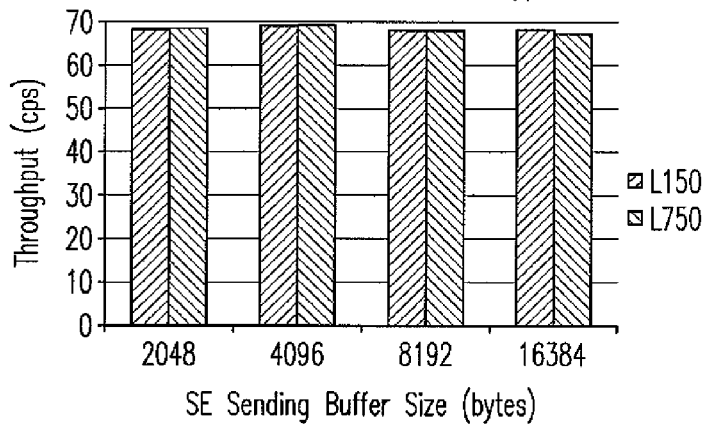
Figure 29:
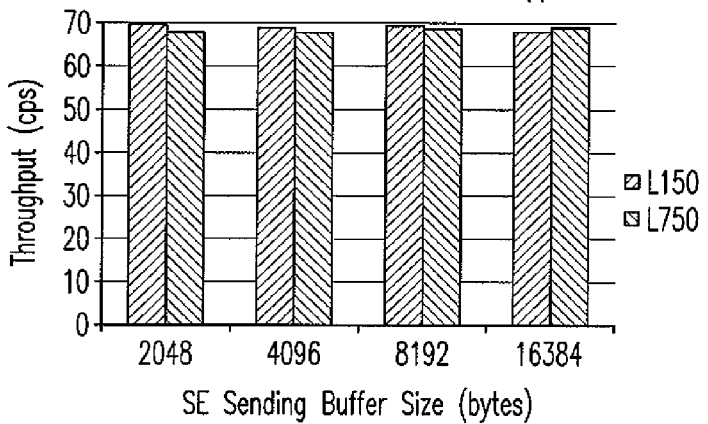

This example studies the impact of varying SE send buffer size. FIG. 29 shows the overload throughput at loads of 150 cps and 750 cps under three different combined RE receive buffer and application buffer settings: both buffers minimized, only receive buffer minimized and only the application buffer minimized. It can be seen that the throughput values in all cases are reasonably close to the system capacity and do not exhibit noticeable differences.

Figure 30:
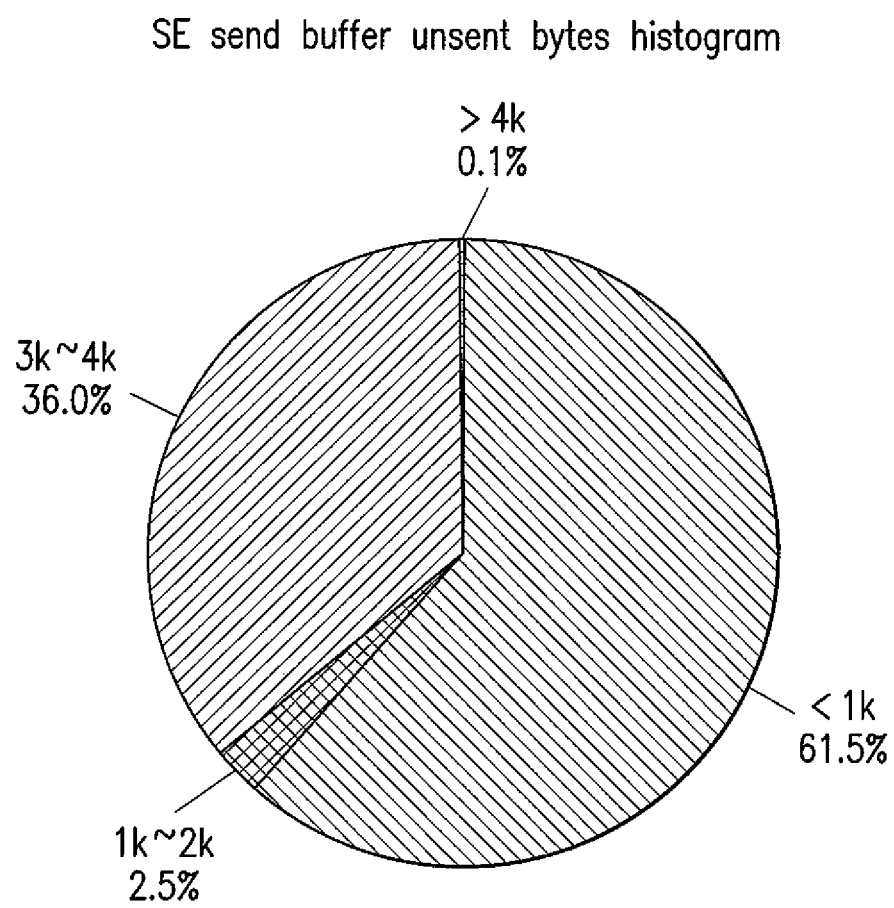
FIG. 30 is a histogram of the SE send buffer unsent bytes.

Next, the SE send buffer size actually used was inspected in a test run with load 750 cps, default SE send buffer, default RE application buffer, and 2 KB RE receive buffer. FIG. 30 shows the histogram of the number of unsent bytes in the SE send buffer when an INVITE arrives but sees a nonempty send buffer. It shows that during over 61% of the times when an INVITE is rejected, the send buffer size is less than 1,000 bytes. It also shows that during over 99.9% of the times when an INVITE is rejected, the send buffer size is less than 3,000 bytes, and the upper bound of number of unsent bytes seen by a rejected INVITE is 5,216 bytes. Furthermore, the number of active sessions at both the SE and RE were within the range of 0 to 4. These numbers are reasonable considering the total length of non-INVITE messages for each session, which is 2,087 bytes as listed in Table 1.

FIG. 30 demonstrates that the SE send buffer size again does not have to be minimized. This can be attributed to the smart forwarding algorithm in accordance with the disclosed subject matter, which essentially prevents excessive non-INVITE message built up in the system. Combined with a minimized buffer at the RE, mechanism in accordance with the disclosed subject matter minimize the number of active sessions in the system, which means there will always be only a small number of messages in the SE send buffer.

Example 5

Performance of SIP-Over-TCP Overload Control Mechanisms

Figure 31:
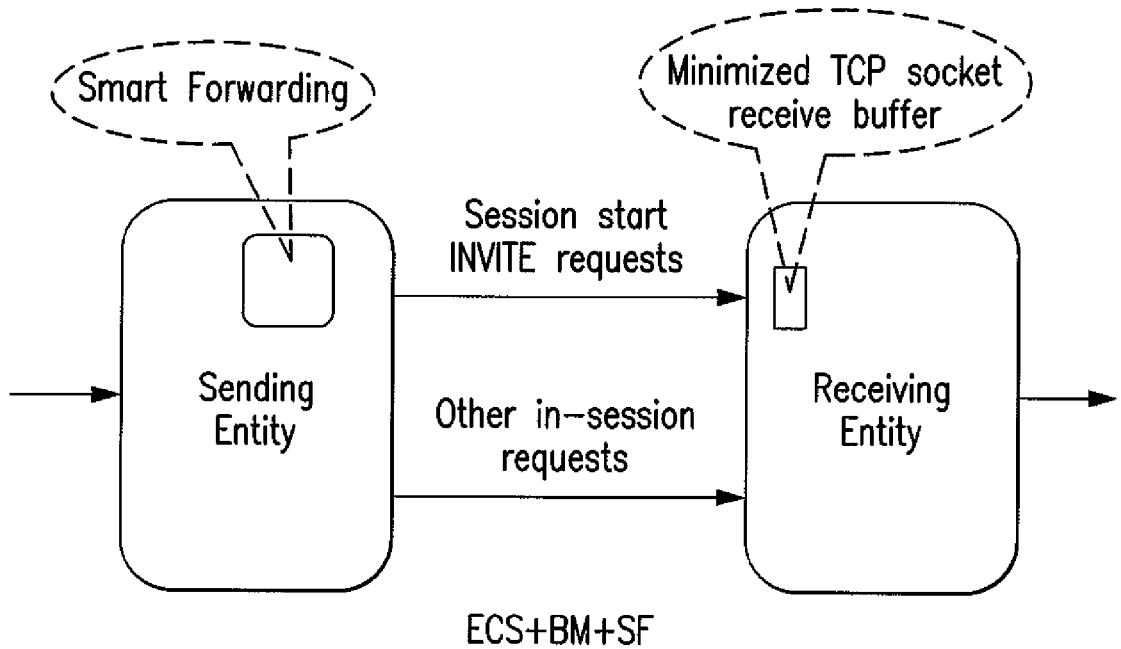
FIG. 31 is a diagram illustrating the SIP-over-TCP overload control mechanisms after parameter simplification, according to some embodiments of the disclosed subject matter.
Figure 31:
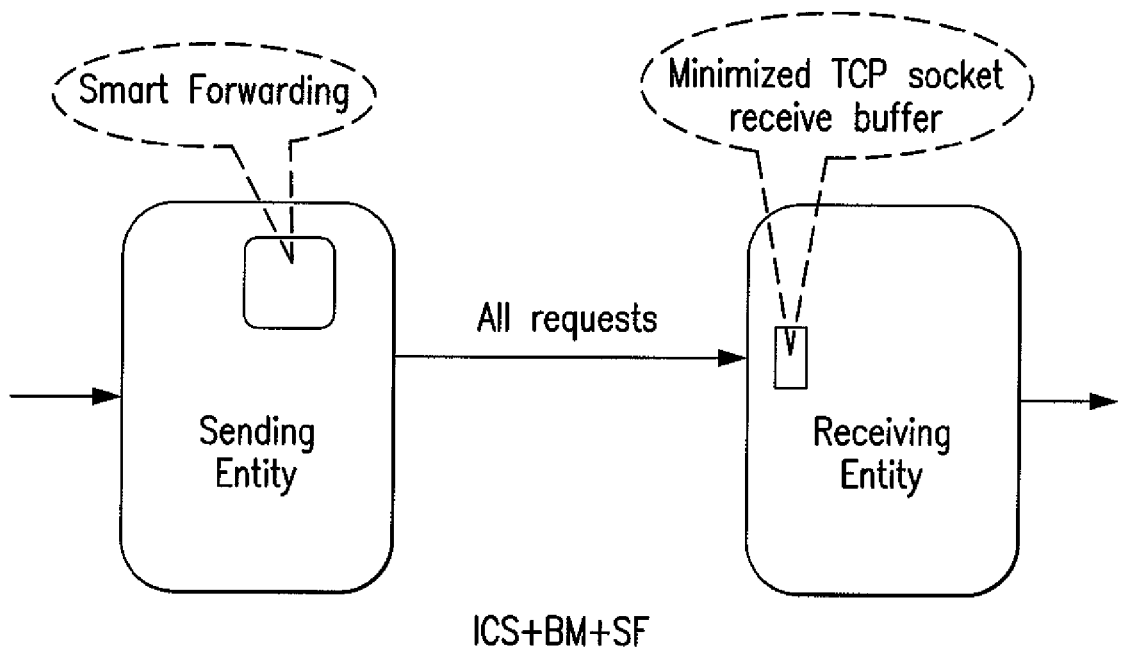

Tests were conducted to evaluate the overall performance of the overload control algorithms in accordance with the disclosed subject matter, with the RE receive buffer as its tuning parameters. These mechanisms are shown in FIG. 31. To demonstrate scalability, three scenarios with 1 SE, 3 SEs and 10 SEs were tested.

A. Overall Throughput and PDD

Figure 32A:
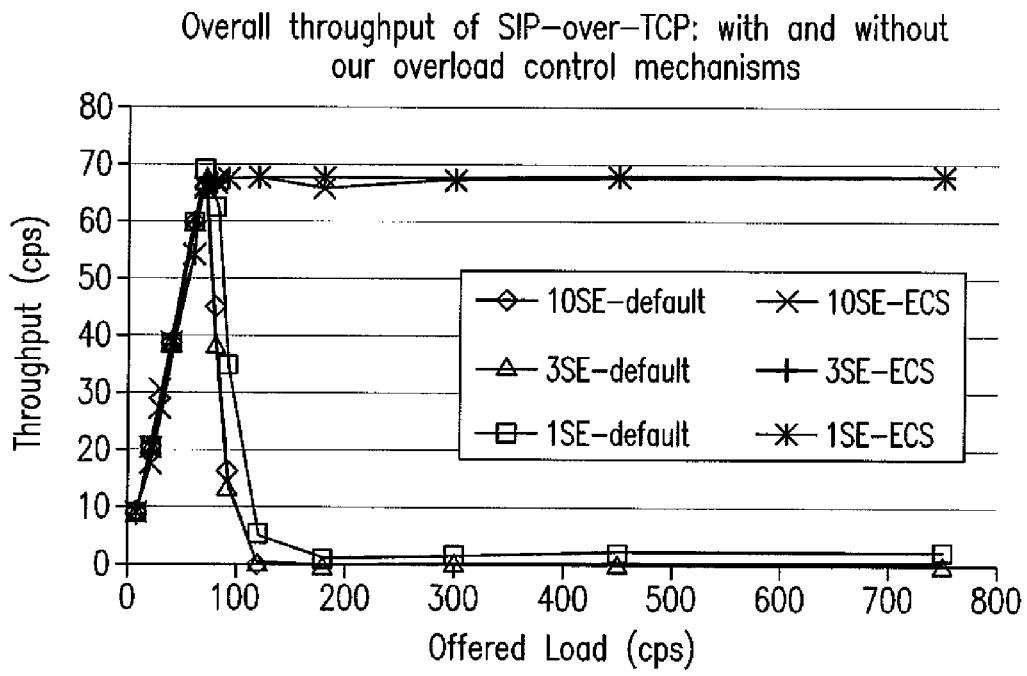
FIGS. 32A and 32B are charts illustrating the throughput of the mechanism of FIG. 31.
Figure 32B:
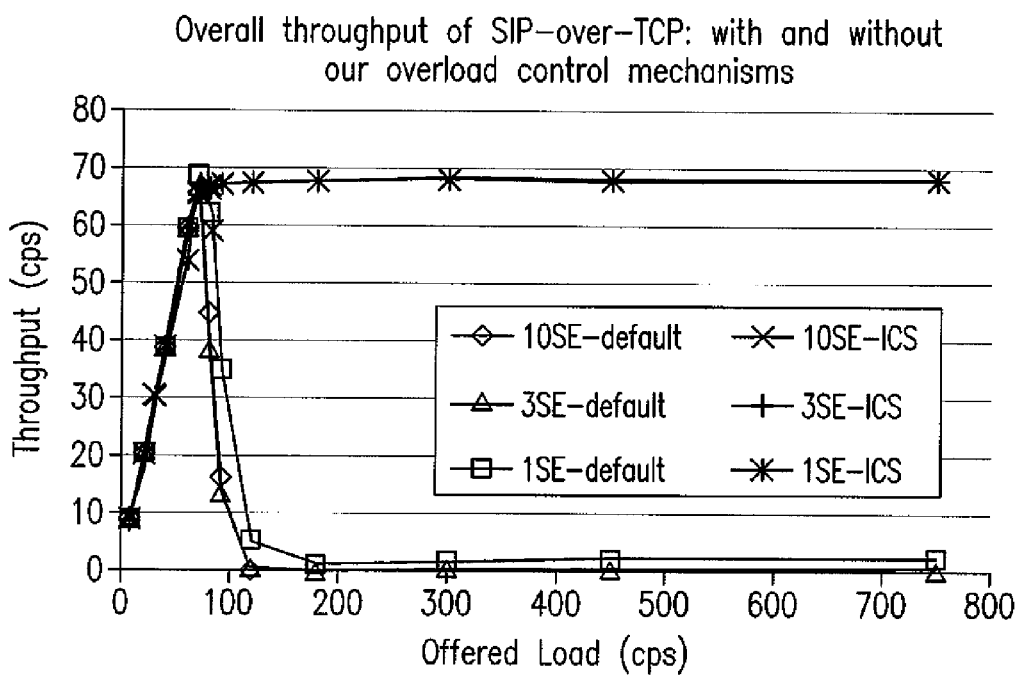

FIG. 32 illustrates the throughput with and without the control mechanisms in three test scenarios with varying number of SEs and an offered load up to over 10 times the capacity. The RE receive buffer was set to 2 KB and the SE send buffer and RE application buffer remained at their default values. As shown in FIG. 32, in all test runs with the control mechanisms, the overload throughput was maintains at close to the server capacity, even in the most constrained case with 10 SEs and 750 cps. There are subtle differences between ECS and ICS though, in that ICS is more effective in rejecting sessions than ECS. As a result, occurrences of 200 OK retransmissions at the 10 SE, 750 cps overload test in ECS are observed, yet there is no 200 OK retransmissions in any ICS test runs.

Figure 33:
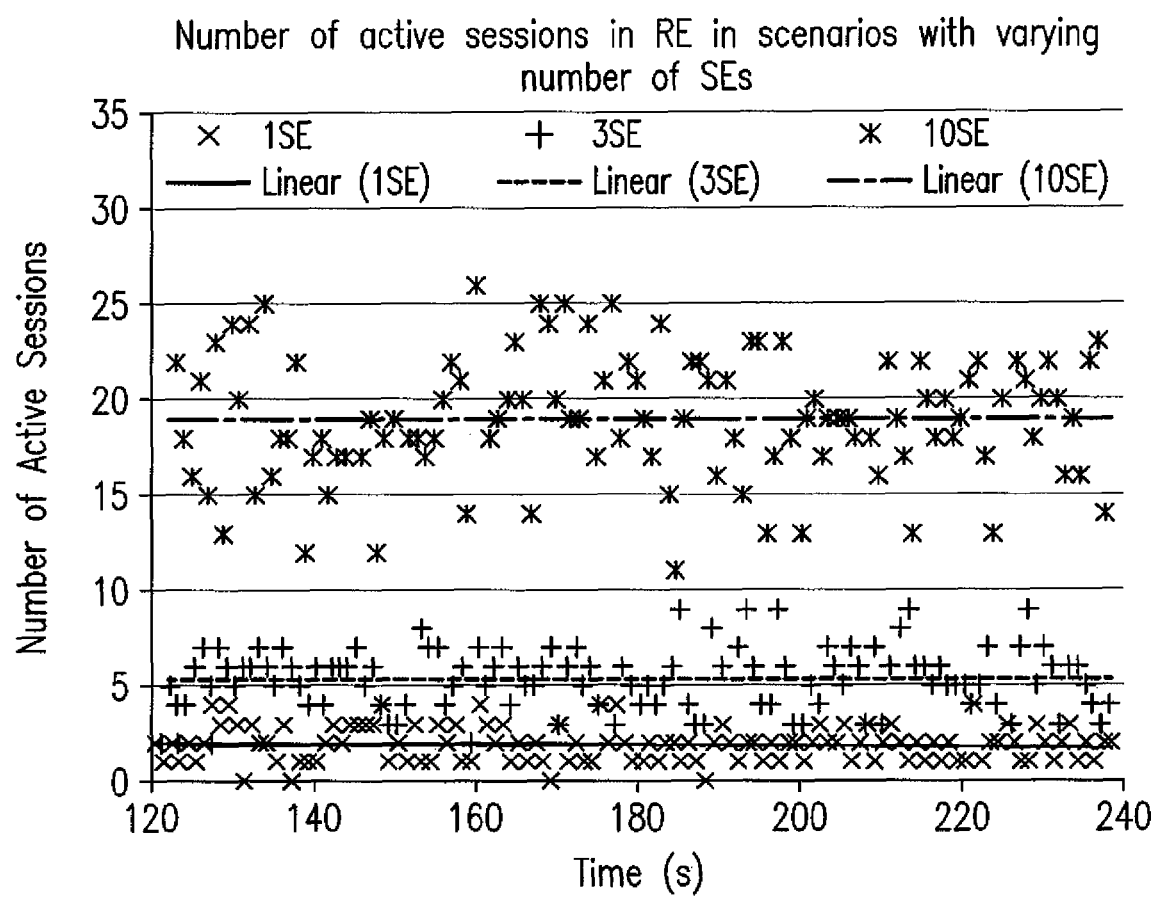
FIG. 33 is a chart illustrating the number of active sessions in RE in scenarios with a varying number of SEs for the mechanism of FIG. 31.

The ICS tests were further compared with different number of SEs. FIG. 33 shows that the numbers of active sessions in RE for the three scenarios roughly correspond to the ratio of the numbers of SEs (1:3:10) because in the testbed configuration each SE creates a new connection to the RE which will be allocated a new set of RE buffers. Increased number of active sessions causes longer PDDs, as demonstrated in FIG. 34, where the overall trend and the 50 percentile values substantially match the 1:3:10 ratio.

Figure 34:
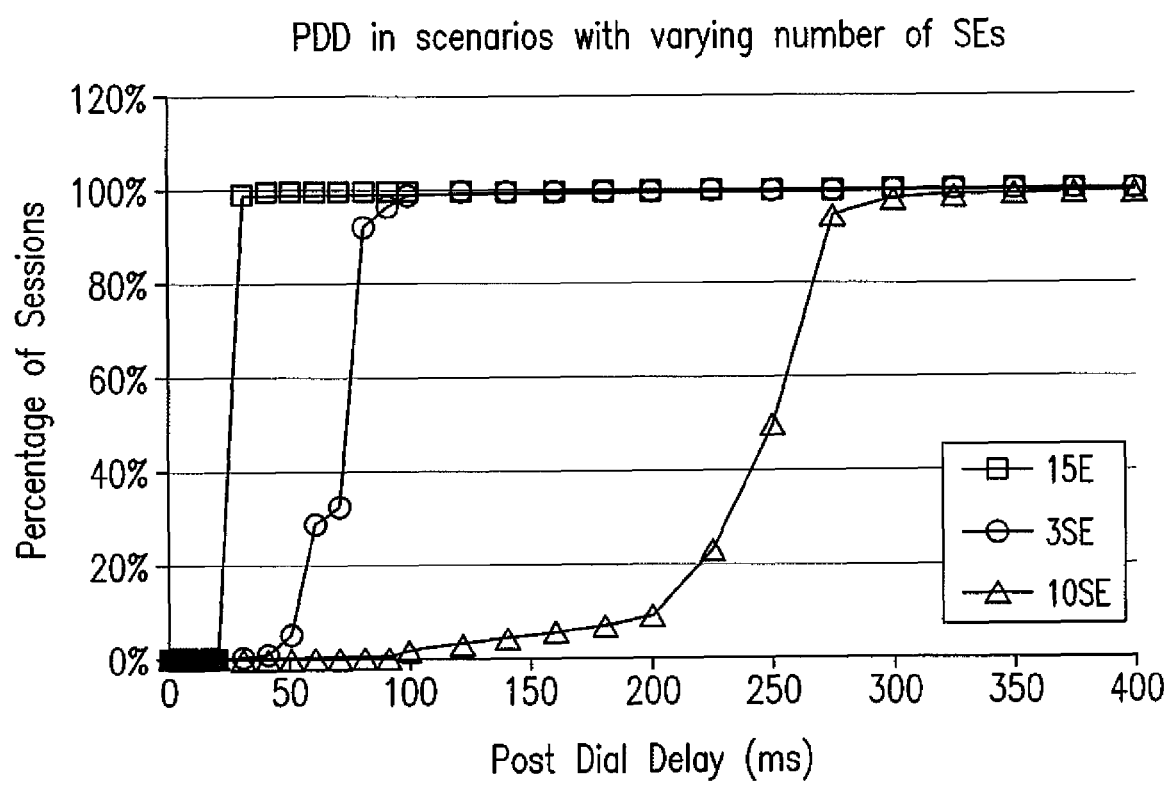
FIG. 34 is a chart illustrating the PDD in scenarios with a varying number of SEs for the mechanism of FIG. 31.

FIG. 33 and FIG. 34 also imply that if the number of SEs keeps increasing to a very large number, an undesirably large number of active sessions will be seen in the system. The PDD will also exceed the response retransmission timer value, although the adverse effect of response retransmission on the actual performance will likely only be observable when the number of such retransmissions accumulates to a certain extent, because the 500 ms retransmission timer value is smaller than the normally several-second acceptable PDD limit, and the processing cost of 200 OK responses is usually not the most expensive among all the messages in the session. The actual crossing point depends on the processing power of the server.

Thus, mechanisms in accordance with the disclosed subject matter are most applicable to cases where the number of SEs are reasonably small, which however, covers a fairly common set of realistic SIP server overload scenarios. For example, there are typical national service providers deploying totally hundreds of core proxy and edge proxy servers in a hierarchical manner. The resulting server connection architecture leaves each single server with a few to dozens of upstream servers. In other cases where a huge number of SEs overloading an RE can occur, e.g., when numerous enterprises, each having their own SIP servers, connect to the same server of a big provider, deploying mechanisms in accordance with the disclosed subject matter in those cases will still benefit the performance, but the degree of effectiveness is inherently constrained by the per-connection TCP flow control mechanism itself.

B. RE Receive Buffer Tuning

Figure 35:
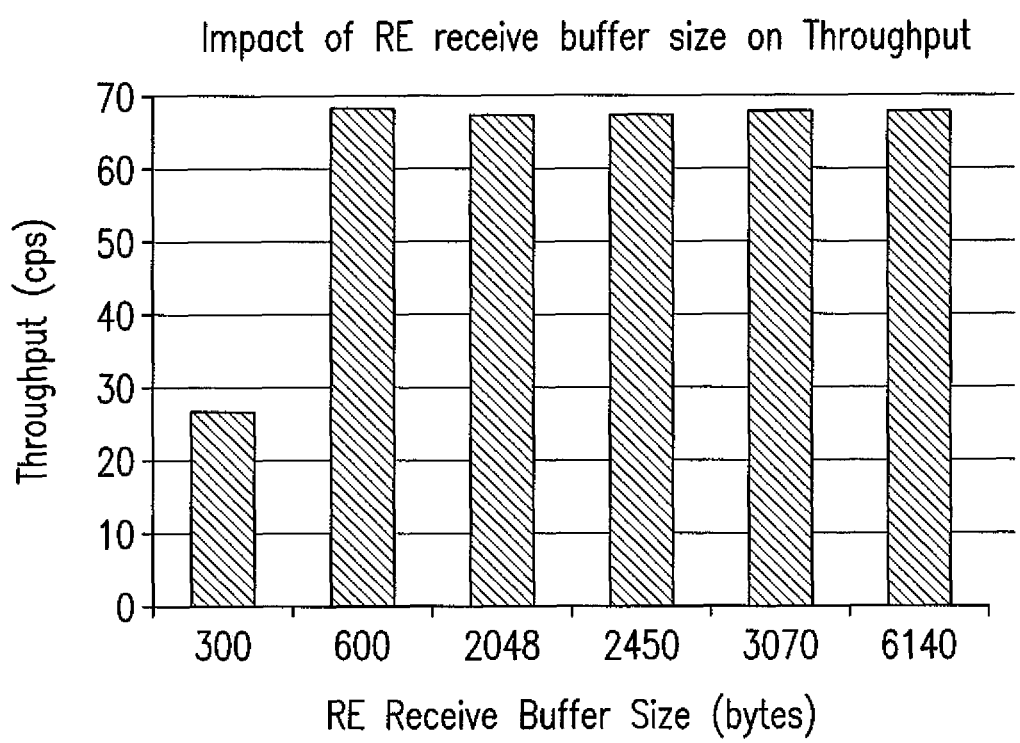
FIG. 35 is a chart illustrating the impact of RE receive buffer size on throughput of the mechanism of FIG. 31.
Figure 36:
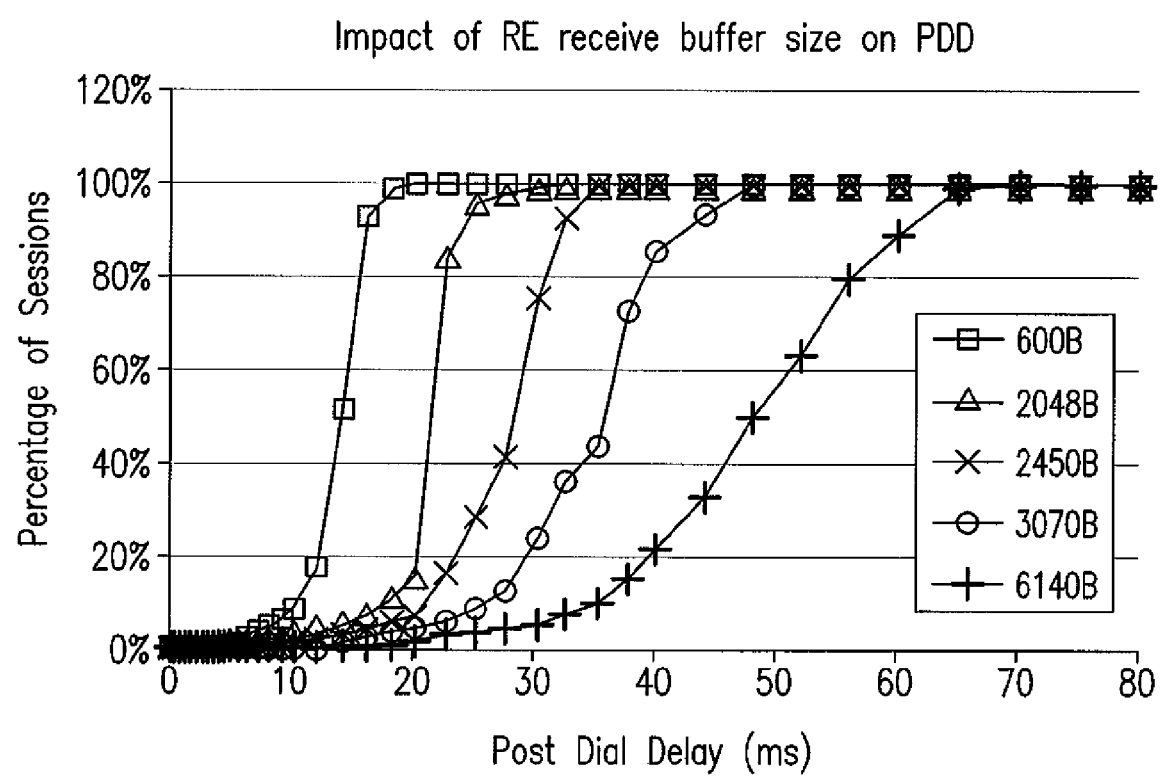
FIG. 36 is a chart illustrating the impact of RE receive buffer size on the PDD for the mechanism of FIG. 31.

The tuning parameter in this test is the RE receive buffer size. FIG. 35 explores the impact of this parameter under the most constrained 10 SEs with load 750 cps case for ICS+ MB+SF. The receive buffer size cannot be too small because it will cause a single message to be sent and read in multiple segments. After exceeding a certain threshold, the receive buffer does not make difference in overload throughput, but the smaller the buffer is, the lower the PDD, as shown in FIG. 36. The PDD is roughly the same as round trip delay. If the round trip delay exceeds 500 ms, 200 OK retransmissions will start to be seen, as in the cases where the receive buffer is larger than 3,070 bytes.

Overload control algorithms in accordance with the disclosed subject matter are meant to kick in when overload occurs. In practice, a desirable feature is to require no explicit threshold detection about when the overload control algorithm should be activated, because that always introduces additional complexity, delay and inaccuracy. If the overload control mechanism is kept on regardless of the load, then how the mechanism could affect the system underload performance should be considered. In general both ECS and ICS have a satisfactory underload performance, meaning the throughput matches closely with a below-capacity offered load such as shown in FIG. 32, but comparatively ECS's underload performance is better than ICS because ICS tends to be more conservative. The ICS mechanism underload throughput noticeably falls below the offered load in a few circumstances—specifically when there is only a single SE, with a receive buffer set around or smaller than the size of a single INVITE, and the load is around 80% to full system capacity. But the combination of these conditions only represents corner cases, which can also be fixed with appropriate parameter tuning if warranted.

Overall, in order to scale to as many SEs as possible yet minimizing the PDD, an RE receive buffer size that holds roughly a couple of INVITEs should be used.

C. Fairness

All of the above tests with multiple SEs assume each SE receives the same request rate from respective UACs, in which case the throughput for each UAC is the same. This test will look at the situation where each SE receives different request rates, and measure the fairness property of the achieved throughput.

Figure 37:
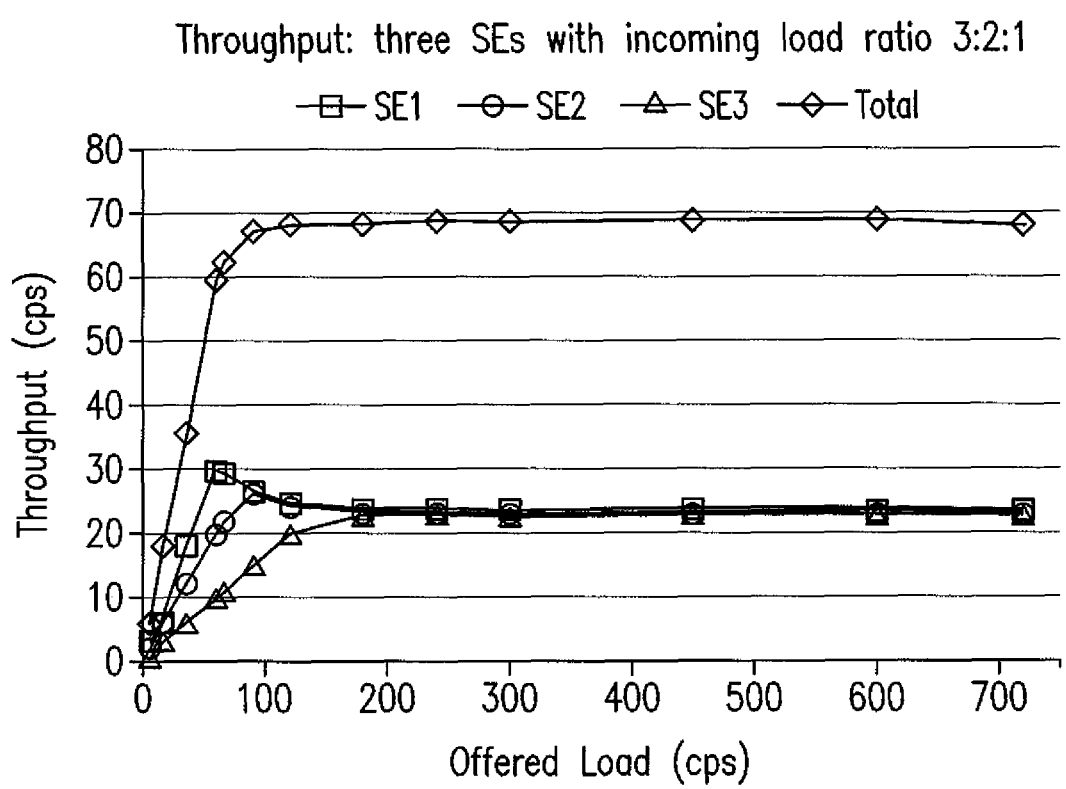
FIG. 37 is a chart illustrating the throughput of three SEs with incoming load ration of 3:2:1.

FIG. 37 shows the throughput of a 3 SE configuration with the incoming offered load to the three SEs distributed at a 3:2:1 ratio. As shown, when the load is below total system capacity, the individual throughputs via each SE follow the offered load at the same 3:2:1 ratio closely. At light to moderate overload until 300 cps, the higher load sources have some advantages in competing RE resources. At higher overload above 300 cps, each SE receives a load that is close to or higher than the server capacity. The advantages of the relatively higher load SEs are wearing out, and the three SEs basically deliver the same throughputs to their corresponding UACs.

Others have defined two types of fairness for SIP server overload: service provider-centric fairness and end user-centric fairness. The former allocates the same portion of the overloaded server capacity to each upstream server; the latter allocates the overloaded server capacity in proportion to the upstream servers' original incoming load. The results show that systems in accordance with the disclosed subject matter achieves service provider-centric fairness at heavy overload.

In conducting the testing with OpenSIPS described herein, subtle software implementation flaws or configuration guidelines were discovered. For example, an SE could block on sending to an overloaded RE. Thus, if there are new requests coming from the same upstream source to the SE which are destined to other REs that are not overloaded, those new requests cannot be accepted either because of the blocking. This flaw will not easily be noticed unless systematic TCP overload tests are conducted. Another issue discovered related to the OpenSIPs process configuration. OpenSIPS employs a multi-process architecture and the number of child processes is configurable. Earlier work with OpenSIPS has found that configuring one child process yields an equal or higher maximum throughput than configuring multiple child processes. However, in testing it was found that when overloaded, the existing OpenSIPS implementation running over TCP with a single child process configuration could lead to a deadlock situation between the sending and receiving entity servers. Therefore, multiple child processes were used.

While the disclosed subject matter is described herein in terms of certain preferred embodiments, those skilled in the art will recognize that various modifications and improvements can be made to the application without departing from the scope thereof. Thus, it is intended that the present application include modifications and variations that are within the scope of the appended claims and their equivalents. Moreover, although individual features of one embodiment of the application can be discussed herein or shown in the drawings of one embodiment and not in other embodiments, it should be apparent that individual features of one embodiment can be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the application such that the application should be recognized as also specifically directed to other embodiments having any other possible combinations. Thus, the foregoing description of specific embodiments of the application has been presented for purposes of illustration and description. It is not intended to be exhaustive or to limit the application to those embodiments disclosed. For example, the disclosed subject matter can be generalized to a much broader application space that share similar load characteristics, such as database systems.

It will be understood that in accordance with the disclosed subject matter, the SIP overload control techniques described herein can be implemented using any suitable combination of hardware and software. The software (i.e., instructions) for implementing and operating the aforementioned control techniques can be provided on computer-readable media, which can include, without limitation, firmware, memory, storage devices, microcontrollers, microprocessors, integrated circuits, ASICs, on-line downloadable media, and other available media.

The invention claimed is:

1. A method for controlling Session Initiation Protocol (SIP) overload between a sending entity and a receiving entity comprising:

receiving a message at a send buffer at the sending entity; and forwarding the message to a receive buffer at the receiving entity if the send buffer is empty of other messages or rejecting the message if the send buffer is not empty of other messages, wherein the message is an INVITE message.

2. The method of claim 1, wherein the message is formatted in accordance with TCP.

3. The method of claim 1, wherein the sending entity is a proxy server.

4. The method of claim 1, wherein the receiving entity is a proxy server.

5. The method of claim 1, wherein rejecting the message comprises sending a rejection message.

6. The method of claim 1, further comprising setting the receive buffer size to a size that holds about two or less INVITE messages.

7. The method of claim 1, further comprising setting the receive buffer size to about 2 KB.

8. The method of claim 1, further comprising setting an application buffer size of the receiving entity to a size that holds about two or less INVITE messages.

9. The method of claim 1, further comprising setting an application buffer size of the receiving entity to a size of about 2 KB.

10. The method of claim 1, further comprising receiving the message at the receive buffer of the receiving entity from the send buffer of the sending entity.

11. The method of claim 10, further comprising sending the message from the receive buffer to an application buffer of the receiving entity.

12. The method of claim 11, further comprising receiving the message at the application buffer at the receiving entity.

13. A method for controlling Session Initiation Protocol SIP overload between a sending entity and a receiving entity comprising:
    receiving a message at a send buffer at the sending entity, wherein the message comprises an INVITE or a non-INVITE message; and
    if the message is an INVITE, forwarding the INVITE to a receive buffer at the receiving entity if the send buffer is empty of other messages or rejecting the INVITE if the send buffer is not empty of other messages, and
    if the message is a non-INVITE message, forwarding the message to the receive buffer at the receiving entity.

14. A method for controlling Session Initiation Protocol (SIP) overload between a sending entity and a receiving entity comprising:
    receiving a message at a send buffer at the sending entity; and
    forwarding the message to a receive buffer at the receiving entity if the send buffer does not indicate an overload condition or rejecting the message if the send buffer indicates an overload condition,
    wherein the message is an INVITE message,
    wherein the send buffer indicates an overload condition if the send buffer is not empty of other messages.

15. A system for controlling Session Initiation Protocol (SIP) overload between a sending entity and a receiving entity comprising:
    a send buffer for receiving a message at the sending entity; and
    a processor, coupled to the send buffer, wherein the processor is configured to, in response to receiving the message, cause the send buffer to forward the message to a receive buffer at the receiving entity if the send buffer is empty of other messages or rejects the message if the send buffer is not empty of other messages, wherein the message is an INVITE message.

16. The system of claim 15, wherein the message is formatted in accordance with TCP.

17. The system of claim 15, wherein the receive buffer has a size that holds about two or less INVITE messages.

* * * * *

UNITED STATES PATENT AND TRADEMARK OFFICE
CERTIFICATE OF CORRECTION

PATENT NO. : 8,804,513 B2  
APPLICATION NO. : 13/035309  
DATED : August 12, 2014  
INVENTOR(S) : Qi Shen and Henning Schulzrinne Page 1 of 1

It is certified that error appears in the above-identified patent and that said Letters Patent is hereby corrected as shown below:

ON THE TITLE PAGE OF THE ISSUED PATENT  
Under the heading: "Related U.S. Application Data"  
At heading (60), where it incorrectly reads:

"Provisional application No. 61/308,037, filed on Feb. 5, 2010."

IT SHOULD INSTEAD READ AS FOLLOWS:

-- Provisional application No. 61/308,037, filed on Feb. 25, 2010. --

Signed and Sealed this  
Twenty-first Day of October, 2014

Michelle K. Lee  
*Deputy Director of the United States Patent and Trademark Office*